United States Patent [19]

Arikawa

[11] Patent Number: 4,783,126

[45] Date of Patent: * Nov. 8, 1988

[54] ANTI-SKID CONTROL APPARATUS FOR A VEHICLE BRAKING SYSTEM

[75] Inventor: Tetsuro Arikawa, Kanagawa, Japan

[73] Assignee: Nippon A B S, Ltd., Tokyo, Japan

[ * ] Notice: The portion of the term of this patent subsequent to Apr. 26, 2005 has been disclaimed.

[21] Appl. No.: 108,902

[22] Filed: Oct. 14, 1987

[30] Foreign Application Priority Data

Oct. 16, 1986 [JP] Japan ................... 61-247146

[51] Int. Cl.$^4$ .................. B60T 8/82; B60T 8/64
[52] U.S. Cl. ..................... 303/96; 188/181 C; 303/97; 303/98; 303/99; 303/100; 303/111; 303/119; 303/92; 303/116
[58] Field of Search ................ 303/91-119, 303/DIGS. 1-4; 188/181; 364/426; 180/197, 244

[56] References Cited

U.S. PATENT DOCUMENTS

| | | | |
|---|---|---|---|
| 3,674,317 | 7/1972 | Mangold | 303/92 X |
| 3,907,377 | 9/1975 | Mayer | 303/113 |
| 3,980,346 | 9/1976 | Leiber | 303/6 R |
| 4,418,966 | 12/1983 | Hattwig | 303/100 |
| 4,421,362 | 12/1983 | Shirai et al. | 303/115 |
| 4,451,096 | 5/1984 | Gygax | 303/109 |
| 4,547,022 | 10/1985 | Brearley et al. | 303/111 X |
| 4,569,560 | 2/1986 | Kubo | 303/116 |
| 4,637,664 | 1/1987 | Arikawa | 303/111 |
| 4,740,040 | 4/1988 | Arikawa | 303/96 |

Primary Examiner—Douglas C. Butler
Attorney, Agent, or Firm—James P. Ryther

[57] ABSTRACT

An anti-skid control apparatus for diagonally connected vehicle wheels including control valve devices arranged between fluid pressure generating chambers of a tandem master cylinder and the wheel cylinders of the front wheels, respectively, and a control unit receiving outputs of speed sensors for judging the skid conditions of the wheels and for instructing the control valve devices. The control unit determines the frictionally lower side of the road on which the wheels are running, and combines logically the judging result of the skid condition of the rear wheel running on that side of the road, with that of the front wheel running on that side. The apparatus then generates instructions for controlling the first or second valve device for the corresponding front wheel, and for controlling the second or first valve device for the other front wheel, on the basis of judging the skid condition of the other front wheel running on the other side of the road independently of the rear wheels. Alternatively, the apparatus may judge skid conditions of the rear wheels and the skid condition of one front wheel running on one side to control the valve device for the corresponding front wheel, and generate instructions to control another valve device for the other front wheel after judging the skid condition of the other front wheel running on the other side of the road.

22 Claims, 20 Drawing Sheets

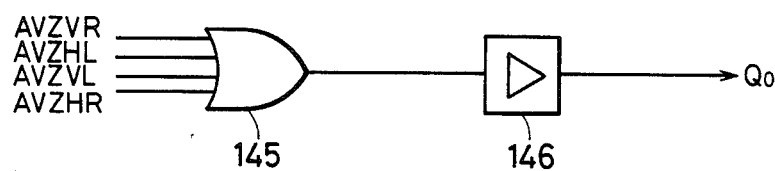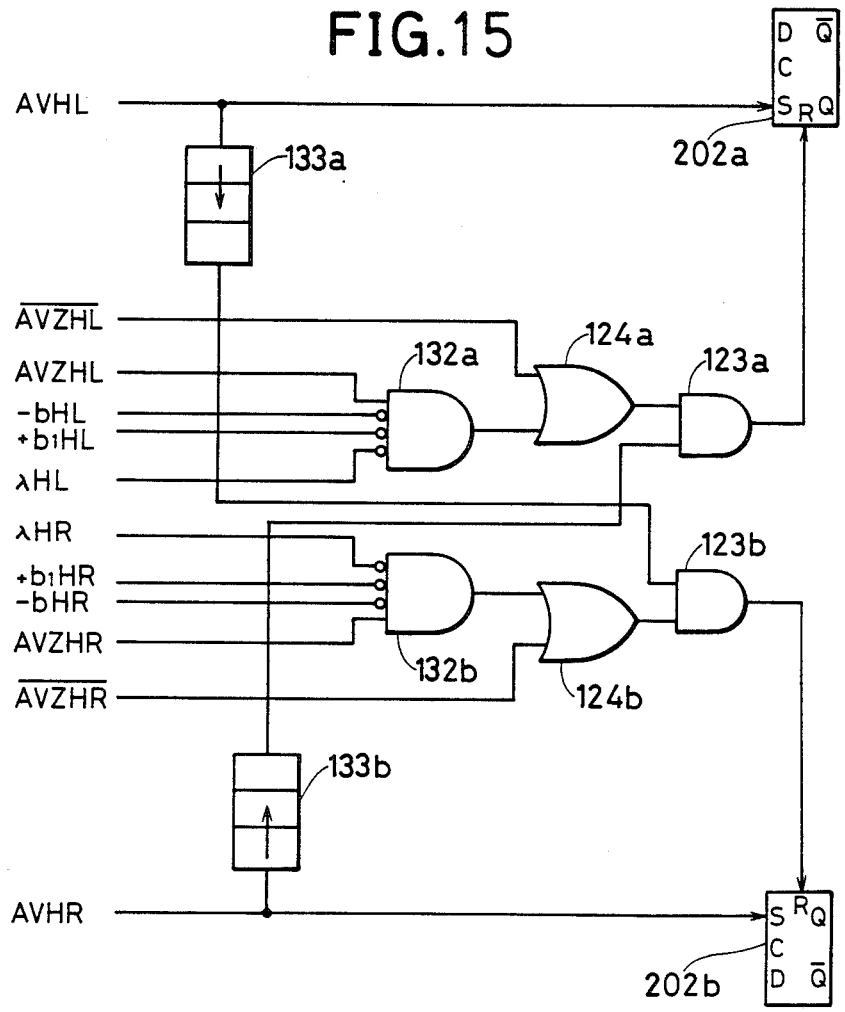

ANTI-SKID CONTROL APPARATUS FOR A VEHICLE BRAKING SYSTEM

BACKGROUND OF THE INVENTION

1. Field of the Invention

This invention relates to an anti-skid control apparatus for a vehicle braking system which can prevent the locking of the wheels.

2. Description of the Prior Art

Such an anti-skid control apparatus for a vehicle braking system is known that includes fluid pressure control valve devices arranged between fluid pressure generating chambers of a tandem master cylinder and the wheel cylinders of the front wheels, respectively, and a control unit receiving outputs of wheel speed sensors for measuring or judging the skid conditions of the front and rear wheels and for generating instructions for controlling the fluid pressure control valve devices.

When the fluid pressure control valve device is provided for each of four wheels (four channels), and the fluid pressure of them are independently controlled, there is no problem on control operation. Or when the fluid pressure control valve device is provided for each of front wheels, and for both of rear wheels in common (three channels), there is no problem on control operation. In the latter case, the one common fluid pressure control valve device is controlled on the basis of the lower one of the speeds of the rear wheels.

However, in the above cases, three or four fluid pressure control valve devices are used. Accordingly, the whole anti-skid control apparatus is large-sized, and very heavy. Since the fluid pressure control valve device is expensive, it requires high cost.

Further, the brake pressures of the front and rear axles can be separately controlled from each other in the four or three channels. Accordingly when the automobile is of the so-called "four wheel drive type" (4WD) which includes at least a center differential as a torque distribution mechanism, there is the possibility that the phase difference and circulating torque occur between the brake controls of the front and rear axles. In that case, the driver feels uncomfortable.

SUMMARY OF THE INVENTION

Accordingly, it is an object of this invention to provide an anti-skid control apparatus for a vehicle braking system which can be small-sized and light, and can be stable in steering.

In accordance with an aspect of this invention, in an anti-skid control apparatus for a vehicle braking system including: (A) a pair of front wheels, and a pair of rear wheels, (B) wheel speed sensors associated with said wheels, respectively; (C) a first fluid pressure control valve device for controlling the brake fluid pressure of the wheel cylinder of one of said front wheels, arranged between a first fluid pressure generating chamber of a tandem master cylinder and said wheel cylinder of the one front wheel; (D) a second fluid pressure control valve device for controlling the brake fluid pressure of the wheel cylinder of another of said front wheels, arranged between a second fluid pressure generating chamber of said tandem master cylinder and said wheel cylinder of the other front wheel; and (E) a control unit receiving outputs of said wheel speed sensors for measuring or judging the skid conditions of said front and rear wheels and for generating instructions for controlling said first and second fluid pressure control valve devices; the improvements in which said control unit discriminates the frictionally lower one (designated as "low side") of the sides of the road on which said wheels are running, on the basis of the measuring or judging results of the skid conditions of said rear and/or front wheels, combines logically the measuring or judging result of the skid condition of the one rear wheel running on said low side of the road, with that of the one front wheel running on the same side as said low side, for generating the instruction for controlling said first or second fluid pressure control valve device for the corresponding front wheel, and generates the instruction for controlling said second or first fluid pressure control valve device for the other front wheel, on the basis of the measuring or judging result of the skid condition of the other front wheel running on the high side (frictionally higher side) independently of those of said rear wheels.

In accordance with another aspect of this invention, in an anti-skid control apparatus for a vehicle braking system including:

(A) a pair front wheels, and a pair of rear wheels;

(B) wheel speed sensors associated with said wheels, respectively;

(C) a first fluid pressure control valve device for controlling the brake fluid pressure of the wheel cylinder of one of said front wheels, arranged between a first fluid pressure generating chamber of a tandem master cylinder and said wheel cylinder of the one front wheel;

(D) a second fluid pressure control valve device for controlling the brake fluid pressure of the wheel cylinder of another of said front wheels, arranged between a second fluid pressure generating chamber of said tandem master cylinder and said wheel cylinder of the other front wheel; and (E) a control unit receiving outputs of said wheel speed sensors for measuring or judging the skid conditions of said front and rear wheels and for generating instructions for controlling said first and second fluid pressure control valve devices; the improvements in which said control unit discriminates the frictionally lower one (designated as "low side") of the sides of the road on which said wheels are running, on the basis of the measuring or judging results of the skid conditions of said rear and/or front wheels, combines logically the measuring or judging results of the skid conditions of said rear wheels with the measuring or judging result of the skid condition of the one front wheel running on the low side for generating the instruction for controlling said first or second fluid pressure control valve device for the corresponding front wheel and generates the instruction for controlling said second or first fluid pressure control valve device or the other front wheel, on the basis of the measuring or judging result of the slip condition of the other front wheel running on the high side (frictionally higher side) independently of those of said rear wheels.

The foregoing and other objects, features, and advantages of the present invention will be more readily understood upon consideration of the following detailed description of the preferred embodiments of the invention, taken in conjunction with the accompanying drawings.

BRIEF DESCRIPTION OF THE DRAWINGS

FIG. 13 is a circuit diagram of a motor drive circuit in FIG. 9;

FIG. 15 is a circuit diagram of an important part of a first modification of the logic circuit of FIG. 12;

DESCRIPTION OF THE PREFERRED EMBODIMENTS

Figure 1:
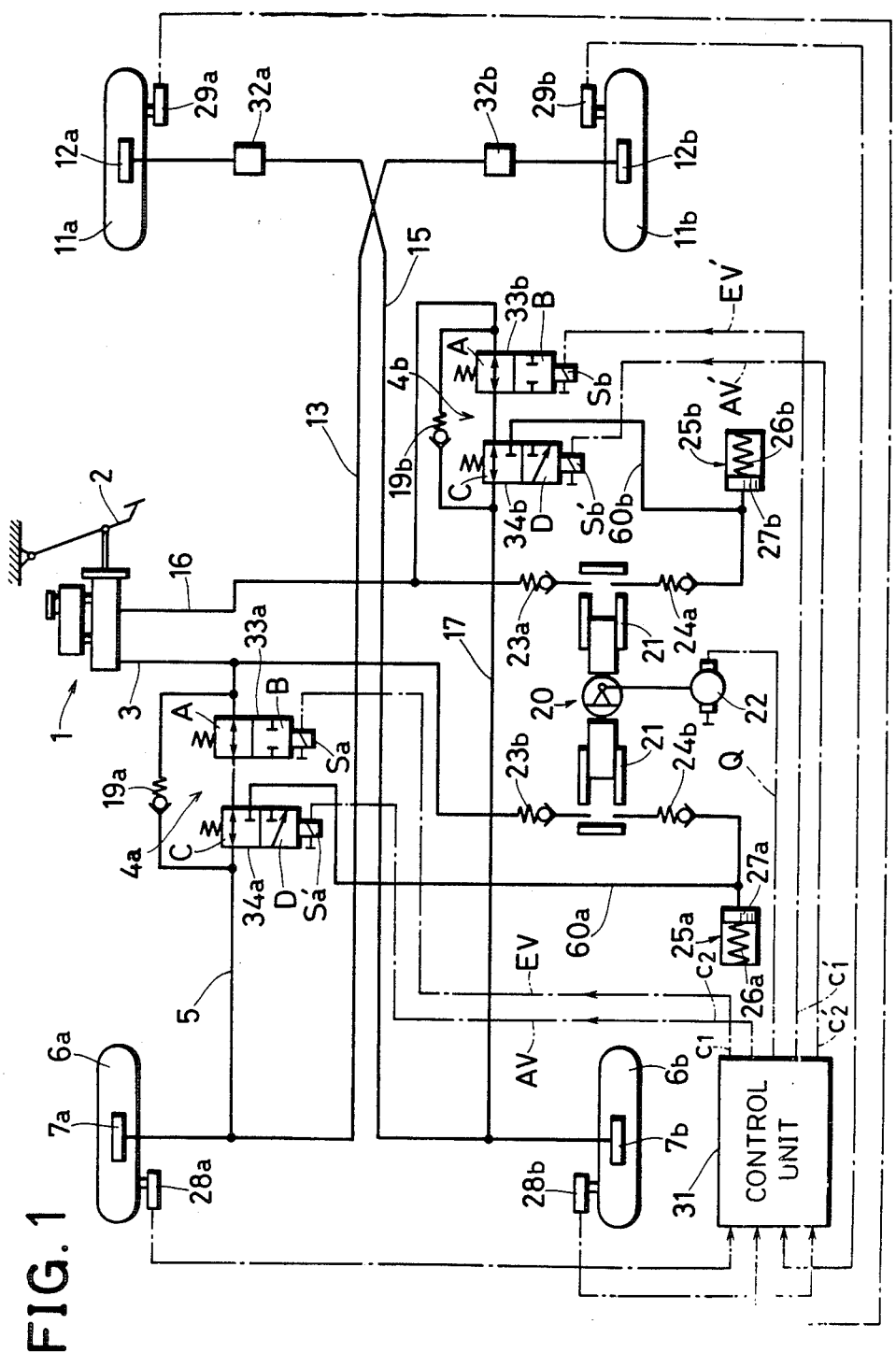
FIG. 1 is a schematic view of an anti-skid control apparatus according to a first embodiment of this invention.

In FIG. 1, a brake pedal 2 is connected to a tandem master cylinder 1. One fluid pressure chamber of the tandem master cylinder 1 is connected to a wheel cylinder 7a of a right front wheel 6a through a conduit 3, an electro-magnetic two position valve device 4a and a conduit 5. The conduit 5 is further connected to a wheel cylinder 12b of a left rear wheel 11b through a conduit 13 and a proportioning valve 32b.

Another fluid pressure chamber of the tandem master cylinder 1 is connected to a wheel cylinder 7b of a left front wheel 6b through a conduit 16, an electro-magnetic two position valve device 4b and a conduit 17. The conduit 17 is further connected to a wheel cylinder 12a of a right rear wheel 11a through a conduit 15 and a proportional valve 32a.

The two position valve devices 4a and 4b consist of inlet and outlet valves 33a, 34a and 33b, 34b, respectively. Discharge openings of the outlet valves 34a and 34b are connected through conduits 60a and 60b to hydraulic reservoirs 25a and 25b, respectively. The hydraulic reservoirs 25a and 25b include pistons 27a and 27b slidably fitted to a casing and relatively weak springs 26a and 26b. Reserving chambers of the reservoirs 25a and 25b are connected to suction openings of a fluid pressure pump 20.

Although the fluid pressure pump 20 is schematically shown, it consists of a pair of casings 21, pistons slidably fitted to the casings 21, an electro-motor 22 reciprocating the pistons, and check valves 23a, 23b, 24a, 24b. Supply openings of the fluid pressure pump 20, or the sides of the check valves 23a, 23b are connected to the conduits 3 and 16.

Wheel speed sensors 28a, 28b, 29a and 29b are associated with the wheels 6a, 6b, 11a and 11b respectively, and they generate pulse signals having frequencies proportional to the rotational speeds of the wheels 6a, 6b, 11a and 11b. The pulse signals of the wheel speed sensors are supplied to a control unit 31.

Figure 2:
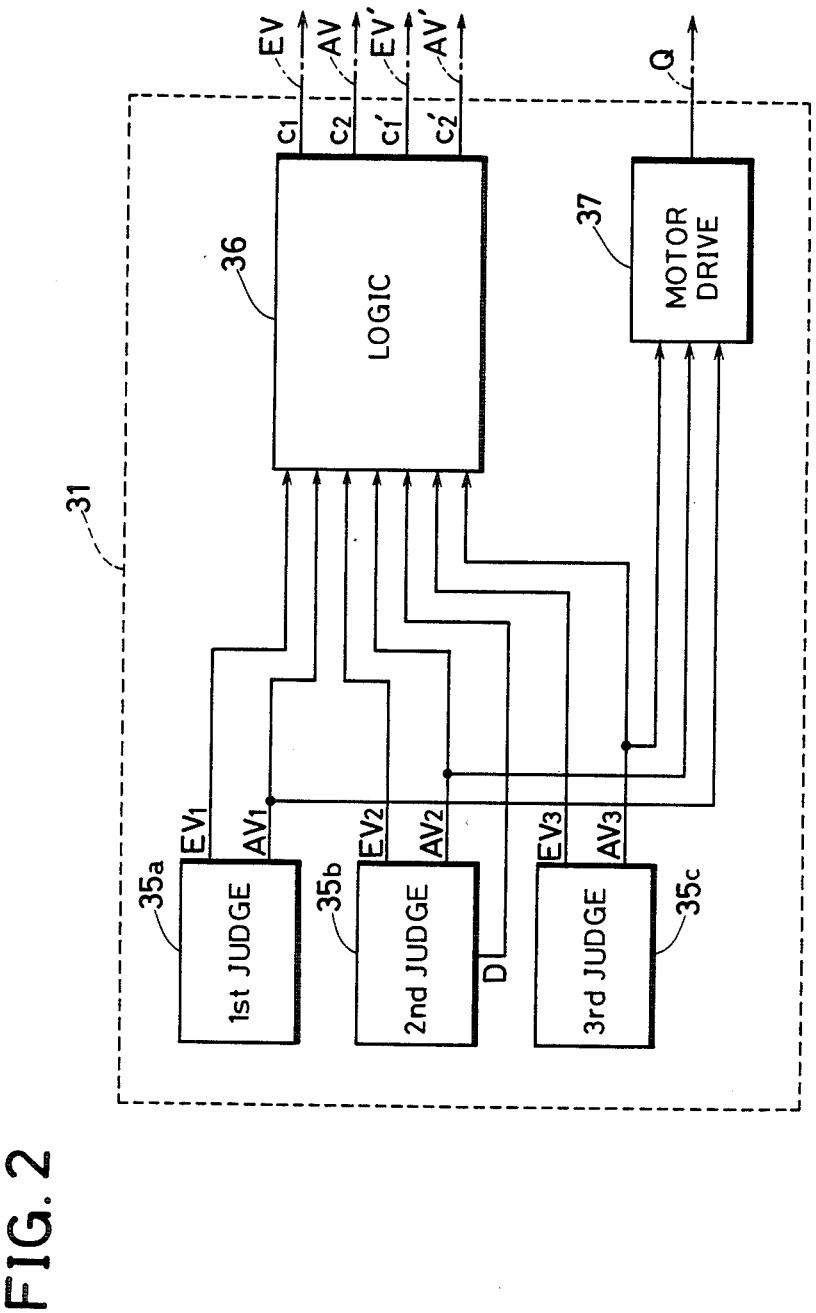
FIG. 2 is a block diagram of a control unit in FIG. 1.

As shown in FIG. 2, the control unit 31 consists of first, second and third judge circuits 35a, 35b and 35c, a logic circuit 36 and a motor drive circuit 37. The first and third judge circuits 35a and 35c are equal to each other in circuit construction. The circuit 35a, 35b, 35c, 36 and 37 will be hereinafter described in detail. Output terminals of the wheel speed sensors 28a and 29b are connected to input terminals of the first and third judge circuits 35a and 35c while output terminals of the wheel speed sensors 29b and 29a are connected to input terminals of the second judge circuit 35b. In other words, the first and third judge circuits 35a and 35c receive the wheel speed signals of the right front wheel 6a and left front wheel 6b, judges them and supply the judge results to the logic circuit 36. The second judge circuit 35b receive the wheel speed signals of the right and left wheels 11a and 11b and judge them. As will be hereinafter described, the lower one of the wheel speed signals is selected, and the judge result is formed on the basis of the lower one. The judge result is supplied to the logic circuit 36. The second judge circuit 35b includes a circuit to discriminate which is lower of the speeds of the rear wheels 11a and 11b. The discrimination signal is supplied to the logic circuit 36. As will be hereinafter described, the judge results are logically combined with each other in the logic circuits 36 in consideration of the discrimination signal. Control signals EV and AV, and EV' and AV' are generated at output terminal C1 and C2 and C1' and C2' of the control unit 31. They are supplied to solenoid portions Sa, Sa', Sb and Sb' of the valves 33a, 34a, 33b and 34b, respectively. Dash lines represent electric lead wires.

Although schematically shown, the electromagnetic valves 33a, 33b, 34a and 34b have well-known constructions.

When the control signals AV, EV and AV', EV' are "0", the valves take first positions A and C for increasing the brake pressure to the brake for the wheel, respectively. In the first positions A and C, the master cylinder side and the wheel cylinder side are made to communicate with each other. When the control signals AV, EV and AV', EV' are "1", the valves take second positions B and D for decreasing the brake pressure to the brake, respectively. In the second positions B and D, the communication between the master cylinder side and the wheel cylinder side is interrupted, while the communication between the wheel cylinder side and the reservoir side is made. The brake fluid is discharged through the conduit 60a and 60b into the reservoir 25a and 25b from the wheel cylinders 7a, 7b and 12a and 12b. When the control signals AV, AV' and EV, EV' are "0" and "1", respectively, the valves 33a and 33b take the second positions B, and the valves 34a and 34b take the first positions C. Thus, the brake pressure to the brake are maintained at constant.

The control unit 31 further generates a drive signal Q for a motor 22, and it is kept during the skid control operation.

In FIG. 1, check valves 19a and 19b are connected between conduits 3 and 5, and 16 and 17 in parallel with the electromagnetic valves 4a and 4b. They permit brake fluid to flow only in the direction from the wheel cylinder side towards the master cylinder side. Both sides of the valves 4a and 4b communicate with each other through throttling holes in the A- and C- positions. Accordingly, pressurized fluid is rapidly returned through the check valves 19a and 19b to the master cylinder 1 from the wheel cylinders 7a, 7b, 12a and 12b, when the brake is released.

Figure 4A:
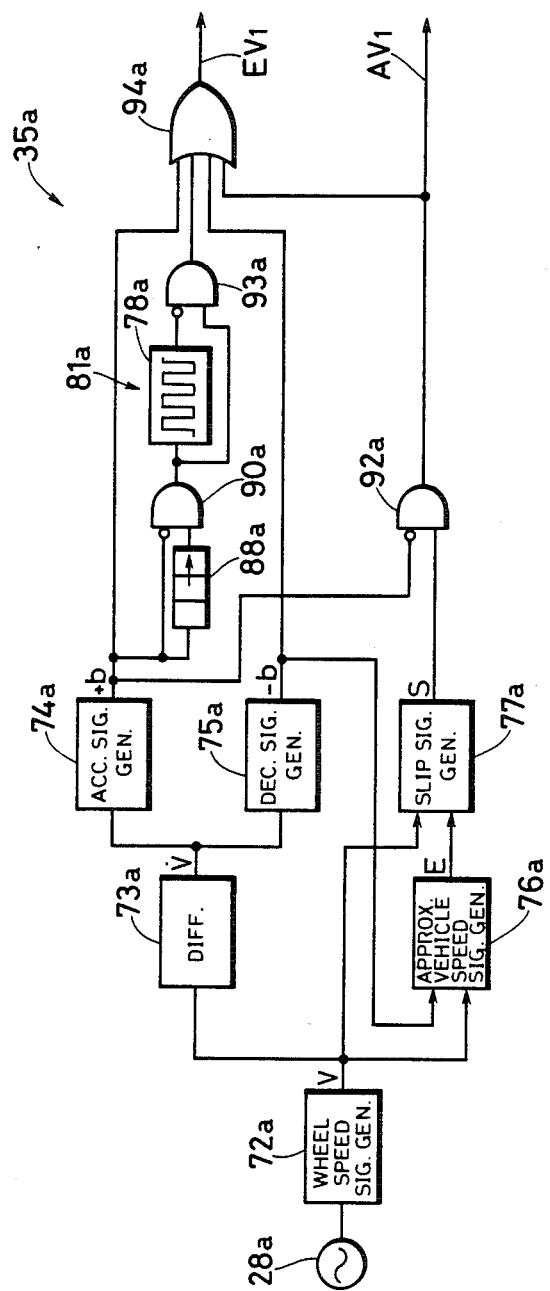
FIG. 4A is a circuit diagram of a first judge circuit in FIG. 2.

The first and third judge circuits 35a and 35c have the same circuit constructions. Accordingly, only the first judge circuit 35a will be described in detail with reference to FIG. 4A.

The signal from the wheel speed sensor 28a is supplied to a wheel speed signal generator 72a. Digital or analogue output proportional to the wheel speed is obtained from the wheel speed signal generator 72a, and it is supplied to an approximate vehicle or body speed signal generator 76a and a slip signal generator 77a and a differentiator 73a.

The approximate vehicle speed signal generators 76a receives the output of the speed signal generator 72a. The outputs of the approximate vehicle speed signal generator 76a is equal to the output of the wheel speed signal generator 72a, until the deceleration of the wheel reaches a predetermined value. After it becomes higher than the predetermined value, the outputs of the approximate vehicle speed signal generators 76a decrease at a predetermined gradient with time. The initial output is equal to the output at the time when the deceleration of the wheel has reached the predetermined value. The output of the approximate vehicle speed signal generator 76a is supplied to the slip signal generator 77a to be compared with the output of the wheel speed signal generator 72a. A predetermined reference ratio or amount is set in the respective slip signal generator 77a. The reference ratio or amount is for example, 0.15 (15%).

Generally, a slip ratio S of the wheel is given by the following formula:

$$S = 1 - \frac{\text{wheel speed } (V, V')}{\text{vehicle speed } (E)}$$

When $(1 - V, V'/E)$ is larger than the reference ratio, a slip signal S is generated from the slip signal generator 77a, namely the output of the slip signal generator 77a, becomes a higher level "1" of the two levels "1" and "0".

The differentiator 73a receive the outputs of the wheel speed signal generators 72a, and differentiate it with respect to time. The output of the differentiators 73a is supplied to a deceleration signal generator 75a, and to an acceleration signal generator 74a. A predetermined threshold deceleration (for example, $-1.5g$) is set in the deceleration signal generator 75a, and it is compared with the output of the differentiator 73a. A predetermined threshold acceleration (for example, 0.5g) is set in the acceleration signal generator 74a and it is compared with the output of the differentiator 73a. When the deceleration of the wheel becomes larger than the predetermined threshold deceleration ($-1.5g$), a deceleration signal $-b$ is generated from the deceleration signal generators 75a or 75b. When the acceleration of the wheel becomes larger than the predetermined threshold acceleration (0.5g), an acceleration signal $+b$ is generated from the acceleration signal generator 74a.

An output terminal of the acceleration signal generator 74a is connected to negation input terminal (indicated by circle o) of AND gate 92a, a negation input terminal of an AND gate 90a, OFF delay timer 88a, and a first input terminal of an OR gate 94a. Output terminal of the OFF delay timer 88a is connected to an input terminal of the AND gate 90a. An output terminal of the AND gate 90a, is connected to an input terminal of a pulse generator 78a, and an input terminal of an AND gate 93a. An output terminal of the pulse generator 78a, is connected to a negation input terminal of the AND gate 93a. A stepwise acceleration signal generator 74a, the OFF-delay timer 88a, the pulse generator 78a, the OR gate 94a, and the AND gate 90a, 93a and it generate pulse signals to slowly increase the brake pressure for delay time of the OFF delay timer is 88a. An output terminal of the AND gate 93a is connected to a second input terminal of the OR gate 94a.

An output terminal of the deceleration signal generator 75a is connected to a third input terminal of the OR gate 94a and to an input terminal of the approximate vehicle speed signal generators 76a. An output terminal of the slip signal generator 77a is connected to an other input terminal of the AND gate 92a. An output terminal of the AND gate 92a, is connected to fourth input terminal of the OR gate 94a.

Signals EV1 and AV1 at output terminals of the OR gate 94a and AND gate 92a are supplied to the following stage, or the logic circuit 36. The output terminal of the AND gate 92a is further connected to the motor drive circuit 37.

Similarly in the third judge circuit 35c, signals EV3 and AV3 are formed in the same manner as above described, and an output terminal of an AND gate corresponding to the above described AND gate 92a is connected to the motor drive circuit 37.

Next, the details of the second judge circuit 35b will be described with reference to FIG. 4B.

The second judge circuit 35b receives the outputs of the wheel speed sensors 29a and 29b which are supplied to the wheel speed signal generators 72a' and 72b'. Outputs of the wheel speed signal generators 72a' and 72b' are supplied to a lower speed selector (so-called "select low") 120. The lower one of the wheel speeds is selected by it. It is supplied to the same circuit portion as the above described first judge circuit 36a. For blocks corresponding to those in the first judge circuit 36a, the suffixes of the reference numerals are altered from a to b. Outputs EV2 and AV2 of OR gate 94b and AND gate 92b are supplied to the logic circuit 36.

In the judge circuit 35b, the higher one of the wheel speeds is selected by a higher speed selector (so-called "select high") 200, and it is supplied to an approximate vehicle speed signal generator 76b.

The outputs of the speed signal generators 72a' and 72b' are further supplied to a comparator 121. The wheel speed signal VHR of the right rear wheel 11a is supplied to a (+) terminal of the comparator 121, while the wheel speed signal VHL of the left rear wheel 11b is supplied to (−) terminal of the comparator 121. Accordingly when the signal VHR is higher than or equal to the signal VHL (VHR≧VHL), an output N of the comparator 121 becomes the higher "1" of the levels "0" and "1". And when the signal VHR is lower than the signal VHL (VHR<VHL), the output N of the comparator 121 becomes the lower "0" of the levels "0" and "1". The output N is supplied to the logic circuit 36.

Next, the details of the logic circuit 36 will be described with reference to FIG. 5.

The logic circuit 36 receives the outputs EV1, AV1, EV2, AV2, EV3, AV3 and N of the former stage. It is constructed symmetrically with respect to the outputs EV1, AV1 and EV3, AV3. The outputs EV1 and EV3 are supplied to first input terminals of first OR gates 100a and 100b, respectively. Outputs of first AND gates 102a and 102b are supplied to second input terminals of the OR gates 100a and 100b. Outputs of second OR gates 101a and 101b are supplied to third input terminals of the first OR gates 100a and 100b.

AV1Z and AV3Z signals in the motor drive circuit 37 to be described hereinafter are supplied through NOT gates 106 and 107 to one input terminals of the first AND gates 102a and 102b. Outputs of second AND gates 103a and 103b are supplied to other input terminals of the first AND gates 102a and 102b.

The output EV2 of the second judge circuit 35b is supplied to one input terminals of the second AND gates 103a and 103b. The output N of the second judge circuit 35b is supplied through a NOT gate 105 to another input terminal of the one second AND gate 103a, while it is supplied directly to another input terminal of the other second AND gate 103b.

The output AV1 and AV3 of the first and third judge circuits 35a and 35c are supplied to one input terminals of the second OR gates 101a and 101b. Outputs of third AND gates 104a and 104b are supplied to other input terminals of the second OR gates 101a and 101b. The output N is supplied through the NOT gate 105 to one input terminal of the one third AND gate 104a, while the output AV2 of the second judge circuit 35b is supplied to another input terminal of the one third AND gate 104a. The output N is supplied directly to one input terminal of the other third AND gate 104b, while the output AV2 of the second judge circuit 35b is supplied to another input terminal of the other third AND gate 104b.

The outputs of the first OR gates 100a and 100b are amplified by amplifiers 108a and 108b. Outputs of the amplifiers 108a and 108b correspond to the above-described outputs EV and EV', respectively. The outputs of the second OR gates 101a and 101b are amplified by amplifiers 109a and 109b. Outputs of the amplifiers 109a and 109b correspond to the above-described outputs AV and AV', respectively.

Figure 6:
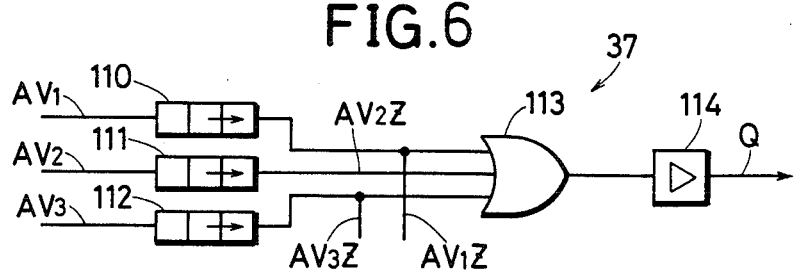
FIG. 6 is a circuit diagram of a motor drive circuit in FIG. 2.

Next, the details of the motor drive circuit 37 will be described with reference to FIG. 6.

The motor drive circuit 37 consists of OFF-delay timers 110, 111, 112 and OR gate 113 receiving outputs of the timers 110, 111, 112 and an amplifier 114. The outputs AV1, AV2, AV3 of the judge circuits 35a, 35b, 35c are supplied to the OFF delay timers 110, 111, 112, respectively. Signals AV1Z, AV2Z and AV3Z at the output terminals of the OFF delay timers 100, 111, 112 are supplied to the OR gate 113. the delay time is so sufficiently long to maintain the output of the OFF-delay timers 110, 111, 112 at the higher "1" of the two levels "1" and "0" during the anti-skid control operation, after the outputs AV1, AV2, AV3 become the lower level "0" of the two levels "1" and "0".

Figure 5:
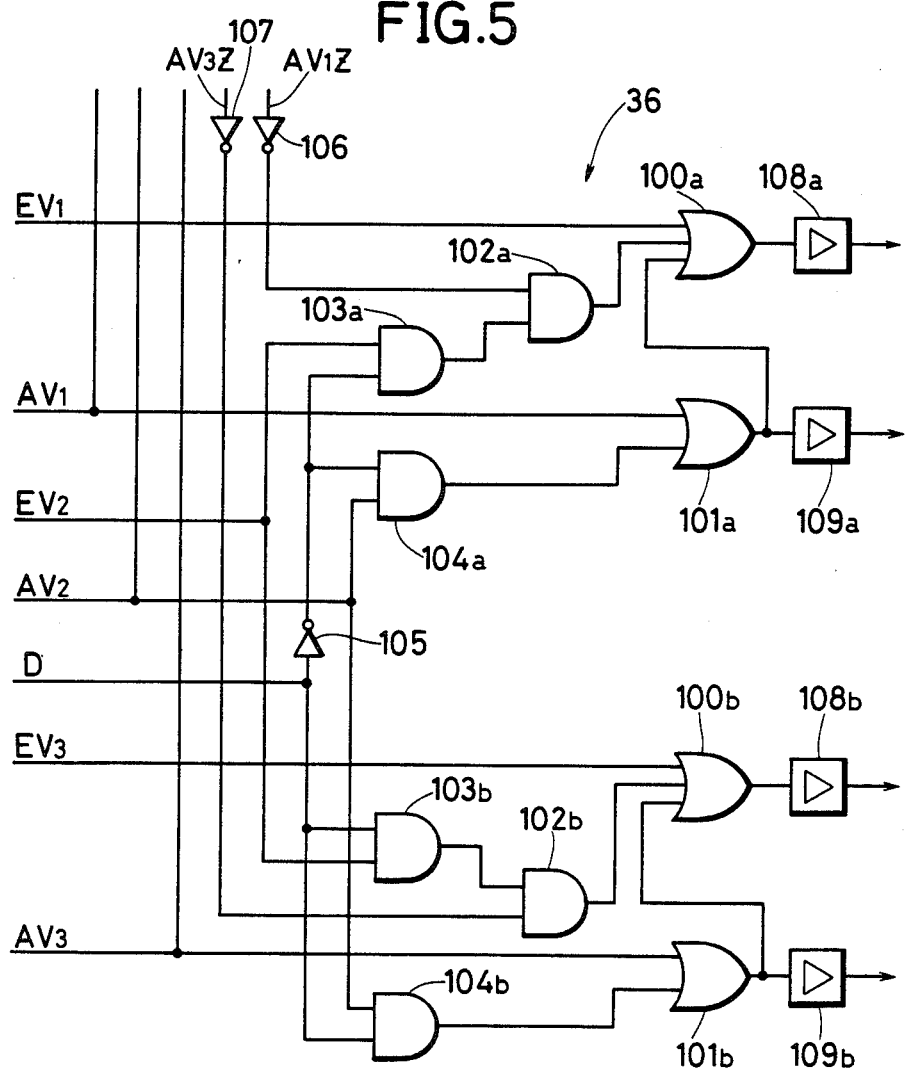
FIG. 5 is a circuit diagram of a logic circuit in FIG. 2.

The signals AV1Z and AV3Z are further supplied to the NOT gates 106 and 107 of the logic circuit 36 in FIG. 5. The output of the OR gate 113 is amplified by the amplifier 114. The output of the amplifier 114 corresponds to the above described motor drive signal Q.

Figure 3:
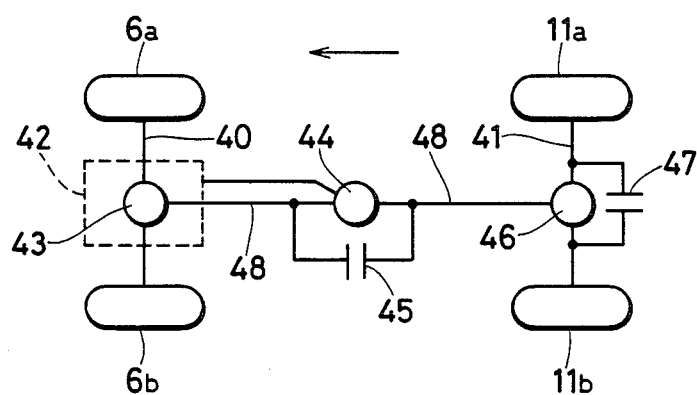
FIG. 3 is a schematic view of a drive vehicle or automobile provided with the first embodiment.

This embodiment is applied to a four wheel drive (4WD) vehicle. Next, its drive system will be described with reference to FIG. 3.

Although schematically shown, driving power of an engine 42 is transmitted to a front wheel axle 40 (front wheels 6a, 6b shown in FIG. 1, are associated at both ends) through a center differential 44, a center shaft 48 and a front differential 43. Further, the driving power of the engine 42 is transmitted to a rear wheel axle 41 (rear wheels 11a and 11b are associated at both ends) through the center differential 44. The center shaft 48 and a rear differential 46. Lock apparatus 45, 47 are connected in parallel with the center differential 44 and the rear differential 46. For facilitating the understanding, the parallel connections are shown. However, the differentials may contain the lock apparatus, respectively.

The lock apparatus 45, 47 are, for example, a viscous coupling or an LSD (Limited Slip Differential). As well known, when the rotational torque difference becomes larger than a predetermined value, between the right and left wheels or between the wheels of the front and rear axles, some rotational torque is transmitted to the other of smaller rotational torque from the one of larger rotational torque. Or a torque in proportion to the rotational torque difference is transmitted to the other.

Next, there will be described operations of the above described anti-skid apparatus.

It is now assumed that the wheels 6a, 6b, 11a and 11b are provided with the tires of the same kind and run on the road which is uniform in frictional coefficient.

The vehicle driver treads the brake pedal 2. At the beginning of the braking, the control signals EV, AV, EV', AV' are "0" from the control unit 31. Accordingly, the valves 33a, 33b and 34a, 34b are in the A-position and the C-position. Pressurized fluid is supplied from the master cylinder 1 to the wheel cylinders 7a and 7b of the front wheels 7a and 7b through the conduits 3, 17, the valves 33a, 33b, 34a, 34b and the conduits 5, 17. Further it is supplied to the wheel cylinders 12a, 12b of the rear wheels 11a and 11b through the conduits 13 and 15. Thus, the wheels 6a, 6b, 11a and 11b are braked. The proportioning valves 32a and 32b effect the well-known operations. When the input pressure is lower than a predetermined value, it is, as it is, transmitted to the output side without reduction. When the input pressure is higher than the predetermined value, it is reduced nearly at a constant rate, and transmitted to the output side.

When the deceleration of the wheels 6a, 6b, 11a and 11b becomes higher than the predetermined acceleration with the increases of the brake fluid pressure, the deceleration signal −b is generated from the deceleration signal generators 75a (designated representatively) in the judge circuits 35a, 35b and 35c. For facilitating the understanding, it is assumed that the decelerations or slips of the wheels 6a, 6b, 11a, 11b equally change and reach the predetermined deceleration or slip at the same time.

The signals EV1, EV2, EV3 become "1" with the deceleration signal −b. The output signals EV, EV' of the logic circuits 36 becomes "1" with the signals EV1, EV2, EV3. The solenoid portions Sa and Sb are energized. The valves 33a and 33b take the second position B. The conduits 3, 16 are interrupted for the conduits 5, 17. Further, the conduits 5, 17 are interrupted from the conduits 60a, 60b. Thus the brake fluid pressures of the wheel cylinders 7a, 7b, 12a, and 12b are maintained at constant.

When the deceleration of the wheels becomes lower than the predetermined deceleration, the deceleration signal −b disappears from the deceleration signal generators 75a and the valves 33a, 33b are again changed into the position A. Thus, the brake fluid pressure again increases. When the slip of the wheels reaches the predetermined slip, the slip signal S is generated from the slip signal generator 77a. The acceleration signal generator 74a do not yet generate the acceleration signal +b. Accordingly, the output AV1, AV2, AV3 of the AND gage 92a become "1". The outputs AV, AV', EV, EV' of the logic circuits 36 become "1". The valves 33a, 33b and 34a, 34b are changed over into the positions B and D. The conduits 3 and 16 are interrupted from the conduits 5 and 17, respectively. However, the conduits 5 and 17 are made to communicate with the conduits 60a and 60b. The pressurized fluid is discharged from the wheel cylinders 7a and 7b of the front wheels 6a and 6b into the hydraulic reservoirs 25a and 25b through the conduits 5, 17, 60a and 60b. The pressurized fluid from the wheel cylinders 12a and 12b of the rear wheels 11a and 11b is discharged through the conduits 15, 13 and the conduits 17, 5, 60a and 60b, into the hydraulic reservoirs 25a and 25b. Thus the brakes of the wheels 6a, 6b, 11a and 11b are relieved.

The fluid pressure pump 20 starts to drive with the signals AV1, AV2, or AV3. The brake fluid is sucked from the reservoirs 25a and 25b and supplied towards the conduits 3 and 16.

When the wheel speeds become higher, and the accelerations of the wheels reach the predetermined acceleration, the acceleration signal +b is generated from the accelerator signal generators 74a. Thus, the outputs EV1, EV2, EV3 of the judge circuits 35a, 35b and 35c become "1". The outputs EV, EV' of the logic circuit 36 become "1". Accordingly, the break fluid pressure of the wheels is maintained at constant.

The pulse generator 78a starts to drive with disappearance of the acceleration signal +b. The outputs EV1, EV2, EV3 change as "0", "1", "0", "1", . . . for the delay time of the OFF-delay timers 88a. Accordingly, the outputs EV, EV' of the logic circuit 36 change similarly. The brake pressures of the wheel stepwisely rise up.

Hereafter, the above-described operations are repeated. When the running speed of the vehicle reaches the desired speed, or when the vehicle stops, the brake pedal 2 is released from treading. The brake fluid is returned from the wheel cylinders 7a, 7b, 12a, 12b to the master cylinder 1 through the conduits, the valves 4a, 4b, the check valves 19a and 19b.

In the above description, the control signals EV1, EV2, EV3 or AV1, AV2, AV3 become "0" or "1" at the same time. However, when the frictional coefficients of the road are considerably different at the right and left sides, the control signals do not become "0" or "1" at the same time. For example, when the frictional coefficient μ of the right side of the road is relatively small, the control signal EV1, EV2 or AV1, AV2 first becomes "1". Next, such a case will be described.

For simplifying the description, it is assumed that the deceleration signals −b or slip signals S of the right wheels 6a, 11a are generated at the same time. In other words, the outputs EV1, EV2 or AV1, AV2 of the first and second judge circuits 35a, 35b become "0" or "1" at the same time. In the second judge circuit 35b, the wheel speed of the rear wheel 11a running on the lower μ side of the road is selected by the selector 120. The skid condition is judged on the basis of the thus selected wheel speed. Since the wheel speed of the rear right wheel 11a is lower than that of the rear left wheel 11b, the output N of the comparator 121 becomes "1", and it is supplied to the logic circuit 36. However, since it is assumed that the front and rear wheels 6a, 11a running on the same lower μ side of the road decelerate at the same rate for facilitating the understanding, the outputs EV2, AV2 of the second judge circuit 35b have no influence on the outputs of the OR gates 100a, 101a in the logic circuit 36.

The output EV or AV of the logic circuit 36 becomes "0" or "1" with the output EV1 or AV1. The brake fluid pressure of the right front wheel 6a is maintained at constant or decreased by functions of the valves 33a, 34a. The left wheels 6b on the higher frictional road side (high μ side) do not yet tend to lock. Accordingly, the outputs EV3, AV3 of the third judge circuit 35c are "0".

Since the wheel speed of the left rear wheel 11b is higher than that of the right rear wheel 11a, the output N of the comparator 121 is "0". Accordingly, although the outputs EV2, AV2 of the second judge circuit 35b become "1", the outputs of the AND gates 103b, 104b are "0".

Accordingly, the outputs EV', AV' of the logic circuit 36 are "0". The valves 33b, 34b are not energized. The brake fluid pressure of the front wheel 6b continues to rise.

When the brake fluid pressure of the right front wheel 6a is lowered, that of the left rear wheel 11b of the same conduit system is lowered, too. Accordingly, the wheel speed of the left rear wheel 11b increases. On the other hand, the brake fluid pressure of the right rear wheel 11a is increasing with that of the left front wheel 6b of the same conduit system. Accordingly, the right rear wheel 11a tends to lock. However, when the rotational torque difference becomes larger than the predetermined value between the rear wheels 11a and 11b, some rotational torque is transmitted to right rear wheel 11a from the left rear wheel 11b of the larger rotational torque through the lock apparatus, and so the wheel speed of the right rear wheel 11a rises. Accordingly, the right rear wheel 11a is prevented from locking.

There has been above described the case that all of the wheels are provided with the tires of the same kind. Next, there will be described the case that only the front wheels 6a, 6b are provided with spike tires or chains. It is assumed that the vehicle runs on the split road, the frictional coefficients of which are considerably different at the right and left sides, and further it is assumed that the right front and rear wheels 6, 11a run on the low-μ side and the left front and rear wheels 6b, 11b run on the high-μ side.

Figure 7:
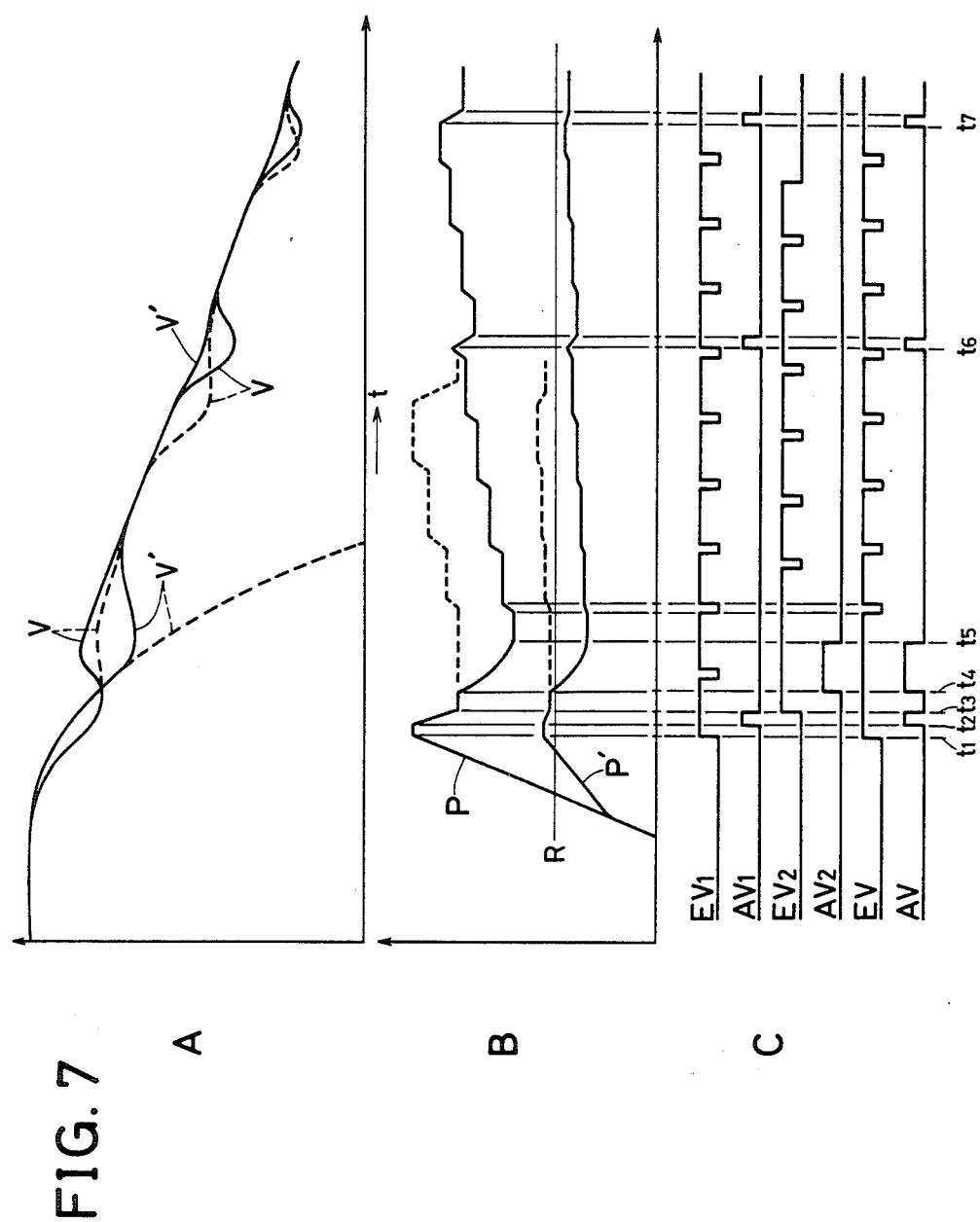
FIG. 7 and FIG. 8 are graphs for explaining operations of the first embodiment of this invention.

When the brake pedal 2 is rapidly trodden, the brake fluid pressure P of the front wheel 6a increases as shown in FIG. 7B. The output EV1 of the first judge circuit 35a becomes "1" at time t1. Accordingly, the output EV of the logic circuit 36 becomes "1" at time t1 as shown in FIG. 7C. Thus, the brake fluid pressure P is maintained at constant.

The output AV1 of the first judge circuit 35a becomes "1" at time t2. Accordingly, the output AV of the logic circuit 36 becomes "1" as shown in FIG. 7C. Thus, the brake fluid pressure P is decreased as shown in FIG. 7B. Although the output AV1 disappears at time t3, the output EV1 is still "1". Accordingly, the output EV is "1", and the brake fluid pressure P is maintained at constant.

The output AV2 of the second judge circuit 35b becomes "1" at time t4. Thus, the slip of the right rear wheel 11a reaches the predetermined value.

Figure 4B:
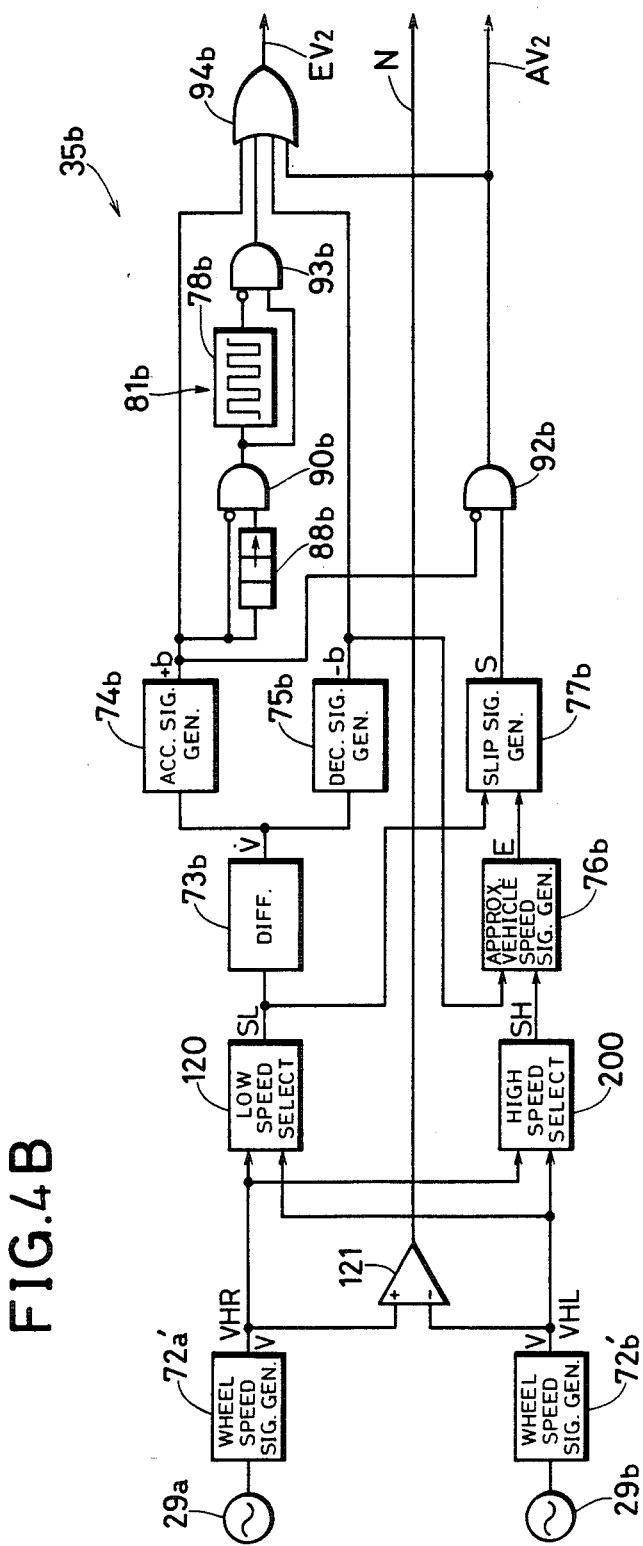
FIG. 4B is a circuit diagram of a second judge circuit in FIG. 2.

In FIG. 4B, the output of the wheel speed sensor 29a provided in the right rear wheel 11a is smaller than that of the wheel speed sensor 29b provided in the left rear wheel 11b. Accordingly, the output of the wheel speed signal generator 72a' is selected by the low speed selector 120 to judge the skid condition. The output N of the comparator 121 is "0". It is inverted by the NOT gate 105 in the logic circuit 36, and supplied to the one input terminals of the AND gates 103a, 104a. Before the output AV2 becomes "1", the output EV2 becomes "1", and it remains "1".

Accordingly, the outputs of the AND gates 103a, 104a become "1". However, when the output EV1 becomes "1", the output EV2 of the first judge circuit 35a has been "1".

Accordingly, it has no influence on the output EV of the OR gate 100a. The signal AV1Z is generated with the output AV1, of the first judge circuit 35a, and it is inverted by the NOT gate 106. The input to the other input terminal of the AND gate 102a becomes "0". Hereafter, the output EV2 of the second judge circuit 35b has no influence on the output EV of the logic circuit 36. The level of the output EV is determined by the outputs EV1, AV1 of the first judge circuit 35a and the output AV2 of the second judge circuit 35b. When the output AV2 becomes "1" at time t4, the brake fluid pressure P is decreased as shown in FIG. 7B. The output AV2 disappears at time t5. However, the output EV1 for the front wheel has become "1" again. Accordingly, the brake fluid pressure P is maintained at constant.

Hereinafter, the output EV1 becomes periodically "0", "1", "0".... Accordingly, the brake fluid pressure P stepwisely rises as shown in FIG. 7B. The output AV1, and therefore the output AV becomes again "1" at time t6. The output EV is "1", while the output AV is "1". The brake fluid pressure P is decreased for the duration of the output AV.

As the result, the brake fluid pressure P of the front wheel 6a changes as shown by the solid line in FIG. 7B. The wheel speed V of the front wheel 6a changes as shown in FIG. 7A. On the other hand, the wheel speed V' of the rear wheel changes as shown by the solid line in FIG. 7A. All of the wheels are prevented from locking. The brake fluid pressure of the left front wheel 6b on the high μ side is increased independently of the locking tendency of the right rear wheel 11a. Thus, the braking distance can be prevented from increasing.

Next, there will be described the case that the front wheels are provided with spike tires or chains, and that the vehicle runs on the road which is uniform in frictional coefficient.

For simplifying the description, it is assumed that both of the rear wheels 11a, 11b equally change.

Accordingly, in the second judge circuit 35b, the output of the low speed selector 120 corresponds to the outputs of the wheel speed signal generators 72a' and 72b' which are equal to each other. The output N of the comparator 121 is "1". Accordingly, the brake fluid pressure of the left front wheel 6b can be controlled also by the skid conditions of the rear wheels 11a, 11b while the brake fluid pressure of the right front wheel 6b is controlled only by its skid condition independently of the skid conditions of the rear wheels 11a, 11b.

Figure 8:
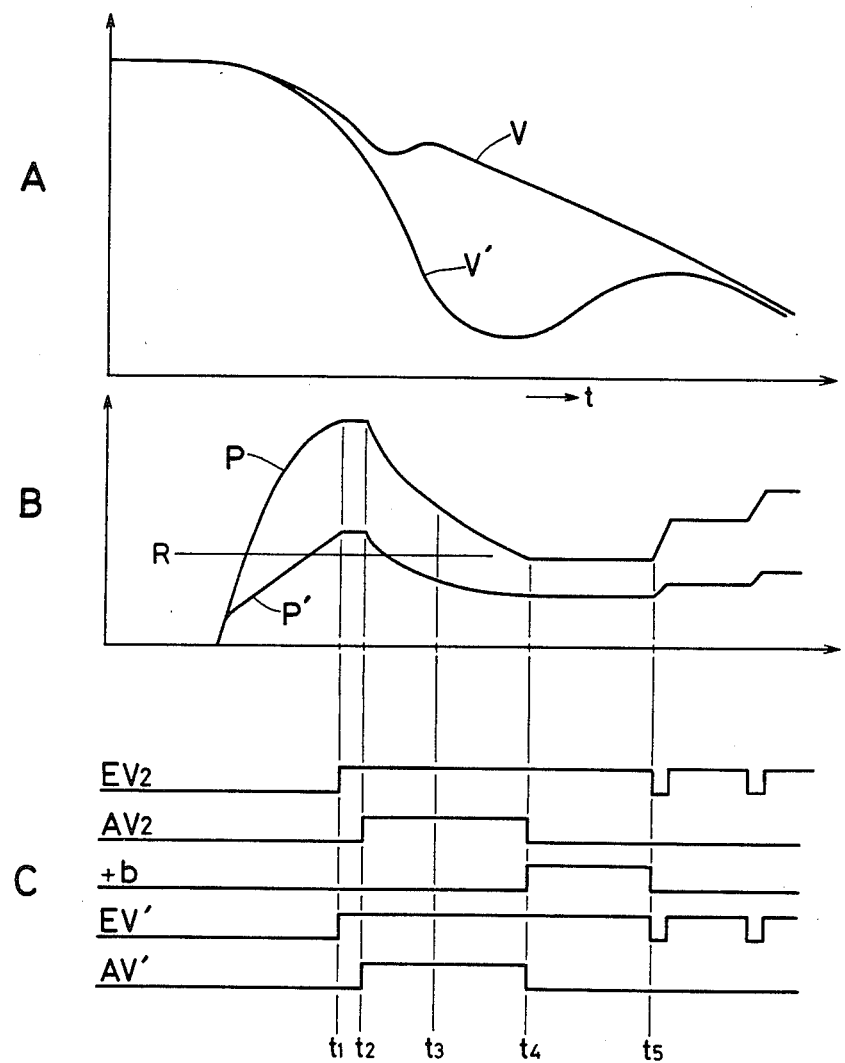

When the deceleration signal −b is generated from the deceleration signal generator 75b in the second judge circuit 35b at time t1, the output EV2 becomes "1" at time t1 as shown in FIG. 8C. It is supplied to the one input terminals of the AND gates 103a, 103b in the logic circuit 36. Since the output N of the comparator 121 is "1" in the second judge circuit 35b, the output of the one AND gate 103b becomes "1". However, since the output N is inverted, the output of the other AND gate 103a remains "0".

The output "1" of the AND gate 103b is supplied to the one input terminal of the following AND gate 102b. The signal AV3Z is supplied through the NOT gate 107 to the other input terminal of the AND gate 103b. Since the left front wheel 6b does not yet tend to lock, the outputs EV3, AV3 of the third judge circuit 35c are "0". Accordingly, the signal AV3Z is "0", and the input to the AND gate 102b is "1". The output of the AND gate 102b becomes "1" together with the output EV2 of the second judge circuit 35b. Accordingly, the output of the OR gate 100b or the output EV' of the logic circuit 36 becomes "1" as shown in FIG. 7C, and so the brake fluid pressure P of the front wheel 6b is maintained at constant. The brake fluid pressure P of the other front wheel 6a continues to rise, since the outputs EV, AV of the logic circuit 36 remain "0". Since the brake fluid pressure P of the left front wheel 6b is maintained at constant, the brake fluid pressure P' of the right rear wheels 11a is maintained at constant, as shown in FIG. 7B. In this case, some rotational torque is transmitted to the right rear wheel 11a from the left rear wheel 11b of the larger rotational torque, and so the wheel speed of the right rear wheel 11a rises. Accordingly, the right rear heel 11a is prevented from locking.

The slip signal S is generated from the slip signal generators 77b at time t2 in the second judge circuit 35b. Or the slip of the rear wheels 11a, 11b becomes larger than the predetermined slip. The output AV2 becomes "1". Thus, the output AV' of the logic circuit 36 becomes "1" at time t2, as shown in FIG. 8C. The brake fluid pressure P of the front wheel 6b decreases with time, as shown in FIG. 8B. Accordingly, the brake fluid pressure P' of the rear wheel 11a decreases as shown in FIG. 8B.

The deceleration signal −b disappear at time t3 in the second judge circuit 35b. However the flip signal S remains generated, and therefore the outputs EV2 remains "1".

Accordingly, the brake fluid pressures P and P' of the front and rear wheels 6b, 11a, continue to decrease as shown in FIG. 8B.

The acceleration signal +b is generated from the acceleration signal generators 74b at time t4 in the second judge circuit 35b. Even when the slip signal S is still generated from the slip signal generators 77b, the output AV2 of the AND gate 92b become "0". However, the accelerator signal +b is supplied to the fourth input terminals of the OR gates 94b. Accordingly, the output EV2 of the OR gate 94b remain "1".

The outputs AV3Z is still "0". The output AV' of the logic circuit 36 becomes "0". However, the output remains "1", as shown in FIG. 7C. Accordingly, the brake fluid pressures P and P' of the front and rear wheels 6b, 11a are maintained at constant.

The acceleration signal +b disappears at time t5. The pulse generator 81b start to operate. the outputs EV2, and therefore EV' change periodically as "0", "1", "0", "1", . . . . Accordingly, the brake fluid pressures P and P' stepwisely increase, as shown in FIG. 7B.

As above described, as soon as the rear wheels 11a, 11b tend to lock, the brake fluid pressure P' is maintained at constant or decreased. Accordingly, although the brake fluid pressure P' may temporarily become higher than the limit lock pressure R, it can be rapidly lowered under the limit lock pressure R. The rear wheels are prevented from locking. The front wheels 6a, 6b are controlled with the skid condition of the rear wheels 11a, 11b, before they tend to lock. Accordingly, the front wheels do not lock.

When the rear wheels do not equally change, the one front wheel is controlled with the skid condition of the one rear wheel at the same side, the wheel speed of the one rear wheel being lower than that of the other rear wheel.

The other rear wheel of the same conduit system is controlled in accordance with the fluid pressure of the one front wheel. However, both of the front wheels 11a and 11b are not controlled. Accordingly, the braking distance can be prevented from being lengthened.

Next, an anti-skid control apparatus according to a second embodiment of this invention will be described with reference to FIG. 9 to FIG. 24. Parts in FIG. 9 which correspond to those in FIG. 1, are denoted by the same reference numerals.

Figure 9:
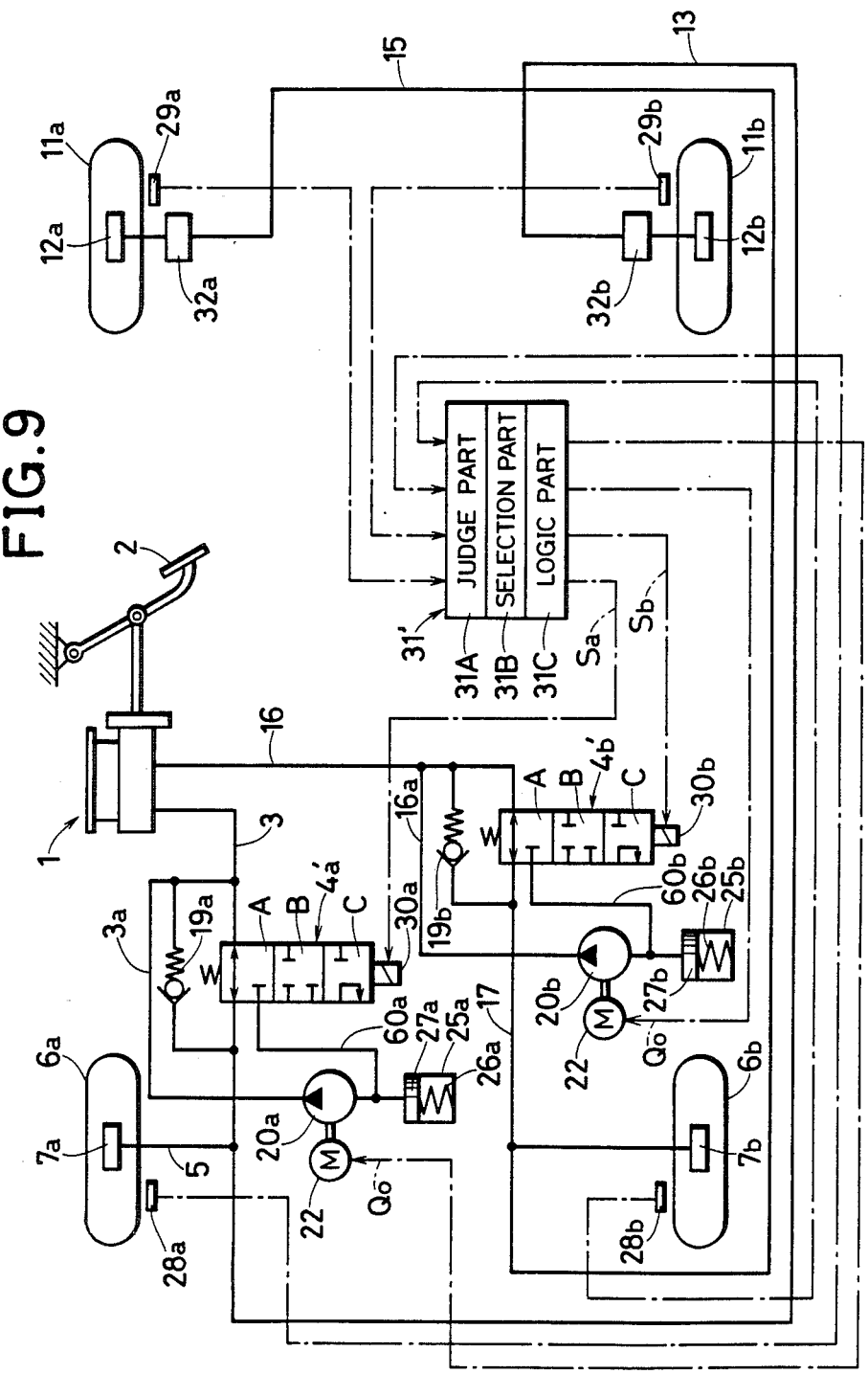
FIG. 9 is a schematic view of a anti-skid control apparatus according to a second embodiment of this invention.

In FIG. 9, the brake pedal 2 is connected to a tandem master cylinder 1. One fluid pressure chamber of the tandem master cylinder 1 is connected to the wheel cylinder 7a of the right front wheel 6a through the conduit 3, an electro-magnetic three position valve device 4a' and the conduit 5. The conduit 5 is further connected to the wheel cylinder 12b of the left rear wheel 11b through the conduit 13 and the proportioning valve 32b.

Another fluid pressure chamber of the tandem master cylinder 1 is connected to the wheel cylinder 7b of the left front wheel 6b through the conduit 16, an electro-magnetic three position valve deice 4b and the conduit 17. The conduit 17 is further connected to the wheel cylinder 12a of the right rear wheel 11a through the conduit 15 and a proportioning valve 32a.

Discharge openings of the valve devices 4a' and 4b' are connected through the conduits 60a and 60b to the hydraulic reservoirs 25a and 25b, respectively. The hydraulic reservoirs 25a and 25b include pistons 27a and 27b slidably fitted to casings and relatively week springs 26a and 26b. Reserving chambers of the reservoirs 25a and 25b are connected to suction openings of fluid pressure pumps 20a and 20b.

Although the fluid pressure pumps 20a and 20b are schematically shown, each of them consist of a pair of casings, pistons slidably fitted to a casings, an electro-motor 22 reciprocating the piston, and check valves. Supply openings of the fluid pressure pump 20a and 20b are connected to the conduits 3a and 16a.

In FIG. 9, two electro-motors 22 are shown, but actually the fluid pressure pumps 20a and 20b are driven by one electro-motor in common, as shown in FIG. 1.

Wheel the speed sensors 28a, 28b, 29a and 29b are associated with the wheels 6a, 6b, 11a and 11b respectively, and they generate pulse signals having frequencies proportional to the rotational speeds of the wheels 6a, 6b, 11a and 11b. The pulse signals of the wheel speed sensors are supplied to a control unit 31' according to this invention.

Although described hereinafter in detail, the control unit 31', consists of a judge part 31A, a selection part 31B and a logic part 31C. Output terminals of the wheels speed sensors 28a, 28b, 29a and 29b are connected to input terminals of the judge part 31A. The judge part 31A receives the wheel speed signals, judges them and supplies the judge results to the selection part 31B and the logic part 31C. As will be hereinafter described, the outputs of the selection part 31B and the judge results are logically combined with each other in the logic part 31C. Control signals Sa and Sb, and motor drive signals Qo as the calculation or measurement results are generated from the control unit 31', and are supplied to solenoid portions 30a and 30b of the valve devices 4a' and 4b' and motors 22, respectively. Dash lines represent electric lead wires.

Although schematically shown, the electro-magnetic valves devices 4a' and 4b' have well-known constructions.

The valve devices 4a' and 4b' take anyone of three positions A, B and C in accordance with the current intensities of the control signals Sa and Sb.

When the control signals Sa and Sb are "0" in current level, the valve devices 4a' and 4b' take first positions A for increasing the brake pressure to the brake for the wheel, respectively. In the first position A, the master cylinder side and the wheel cylinder side are made to communicate with each. When the control signals Sa and Sb are "½" in current level, the valve devices 4a' and 4b' take second positions B for maintaining the brake pressure to the brake at constant, respectively. In the second position B, the communications between the master cylinder side and the wheel cylinder side, and between the wheel cylinder side and the reservoir side are interrupted. When the control signals Sa and Sb are "1" in current level, the valve devices 4a' and 4b' take third positions C for decreasing the brake pressure to the brake, respectively. In the third position C, the communication between the master cylinder side and the wheel cylinder side is interrupted, while the communication between the wheel cylinder side and the reservoir side is made. The brake fluid is discharged through the conduit 60a and 60b into the reservoir 25a and 25b from the wheel cylinders 7a, 7b and 12a and 12b.

The control unit 31' further generates drive signal Qo for the motors 22 and 22. When anyone of the control signals Sa and Sb becomes initially "1", the drive signal Qo is generated, and it is kept during the skid control operation. The drive signal Qo is supplied to the motors 22 and 22.

Next, the details of the judge part 31A in the control unit 31' will be described with reference to FIG. 10.

The judge part 31A receives the outputs of the sensors 28a, 28b, 29a, 29b to judge the skid conditions of the wheels 6a, 6b, 11a, 11b. The judge circuits for the respective wheels 6a, 6b, 11a, 11b are the same in construction. FIG. 10 shows only the judge circuit for the right front wheel 6a. It will be representatively described hereinafter. However, it is partially in common with the judge circuit for the left rear wheel 11b of the same conduit system. Accordingly, only a part of the judge circuit for the left rear wheel 11b is shown in FIG. 10. The signals from the wheel speed sensors 28a and 29b are supplied to wheel speed signal generators 61a and 61b. Digital or analogue outputs proportional to the wheel speeds are obtained from the wheel speed signal generator 61a and 61b and they are supplied to differentiators 62a, 62b, slip signal generators 172a, 172b and a slip ratio setting circuit 69. The circuit 69 is in common, in the judge circuits for the front and rear wheels 6a and 11b of the same conduit system. It consists of an approximate vehicle speed signal generator 66 and multipliers 67 and 68. The higher of the outputs of the wheel speed signal generators 61a and 61b is selected, and an approximate vehicle speed signal is formed on the basis of the higher one, in the approximate vehicle speed signal generator 66. For example, multiplier numbers 0.85 and 0.70 are set in the multiplies 67 and 68, respectively. Output terminals of the slip ratio setting circuit 69 are connected to change-over circuits 70a and 70b. In the circuits 70a and 70b, movable contacts are normally connected to the output sides of the multiplier 68. Output terminals of the change-over circuits 70a and 70b are connected to the slip signal generators 172a, 172b. The outputs of the change-over circuits 70a and 70b, therefore, the values of (the approximate vehicle speed x the output 0.85 or 0.70 of the multiplier 67 or 68) are compared with the wheel speeds as the outputs of the wheel speed signal generators 61a and 61b, in the slip signal generators 172a and 172b. When the formers are smaller than the latters, the slip signal generators 72a and 72b generate slip signals Since the judge circuits are the same for the left rear wheel 11b and right front wheel 6a, hereinafter only the judge circuit for the right front wheel 6a will be described.

The differentiator 62a receives the output of the wheel speed signal generator 61a and differentiate it with respect to time. The output of the differentiator 62a is supplied to a deceleration signal generator 63a, and to first and second acceleration signal generators 64a and 65a. A predetermined threshold deceleration (for example, $-1.4g$) is set in the deceleration signal generator 63a, and it is compared with the output of the differentiator 62a. Predetermined threshold accelerations (for example, 0.5g and 7g) are set in the first and second acceleration signal generators 64a and 65a respectively and they are compared with the output of the differentiator 62a. When the deceleration of the wheel becomes larger than the predetermined threshold deceleration ($-1.4g$), a deceleration generator 63a. When the acceleration of the wheel becomes larger than the predetermined threshold acceleration (0.5g) or (7g), an acceleration signal $+b_1$ or $+b_2$ is generated from the acceleration signal generator 64a or 65a.

An output terminal of the first acceleration signal generator 64a is connected to negation input terminals (indicated by circle O) of AND gates 173a, 178a, and a first input terminal of an OR gate 82a. An output terminal of the AND gate 178a is connected to an input terminal of a pulse generator 80a and an input terminal of an AND gate 181a. An output terminal of the pulse generator 80a is connected to a negation input terminal of the AND gate 181a. A stepwise brake-increasing signal generator (U) is constituted by the pulse generator 80a, the OR gate 82a, and the AND gate 181a, and it generates pulse signals to slowly increase the brake pressure. The width of the first pulse is so designed as to be larger than that of the sequent pulses in the pulse generator 80a. Thus, the insufficiency of the braking force is prevented.

The output terminal of the deceleration signal generator 63a is connected to a second input terminal of the OR gate 82a. The output terminal of the AND gate 181a is connected to the third input terminal of the OR gate 82a. The output terminal of the slip signal generator 172a is connected to the other input terminal of the AND gate 173a. The output terminal of the AND gate 173a is connected to one input terminal of an OR gate 176a. An output terminal of an AND gate 175a is connected to another input terminal of the OR gate 176a. The output terminal of the deceleration signal generator 63a is connected to one input terminal of the AND gate 175a and an output terminal of an OFF delay timer 86a is connected to another input terminal of the AND gate 175a. The delay time of the OFF delay timer 86a is sufficiently long. Once the output of the OFF delay timer 86a becomes "1", it is maintained during the anti-skid control operation. An output terminal of the OR gate 176a is connected to an input terminal of the OFF delay timer 86a, and further connected to one input terminal of an OR gate 87a. The output terminal of the OFF delay timer 86a is connected to another negation input terminal of the OR gate 87a.

An output terminal of the OR gate 87a is connected to one input terminal of a counter 188a, and the output terminal of the AND gate 181a of the stepwise brake-increasing signal generator U is connected to another input terminal of the counter 188a. Pulses from the AND gate 181a are counted by the counter 188a. When the counted number reaches a predetermined number, the output of the counter 188a becomes "1". And when the output of the OR gate 87a becomes "1", the content of the counter 188a is reset.

The output terminals of the deceleration signal generator 63a, first acceleration signal generator 64a, and pulse signal generator 80a are further connected to the respective input terminals of an OR gate 71a. The change-over circuit 70a is changed over by the output of the OR gate 71a. When the output of the OR gate 71a becomes "1", the movable contact of the change-over circuit 70a is changed over to the output side of the multiplier 67.

The output terminal of the OR gate 82a is connected to one input terminal of an AND gate 83a, and the output terminal of the second acceleration signal generator 65a is connected to another negation input terminal. The output terminal of the AND gate 83a is connected to one input terminals of an AND gate 84a and OR gate 85a. The output terminal of the OR gate 176a is connected to another negation input terminal of the AND gate 84a and to another input terminal of the OR gate 85a.

The output terminal of the AND gate 175a is connected to an OFF delay timer 177a. The output terminal thereof is connected to a fourth input terminal of the OR gate 82a, another OFF delay timer 131a and further a negation input terminal of an AND gate 130a. The output terminal of the OFF delay timer 131a is connected to another input terminal of the AND gate 130a.

The judge circuit for the right front wheel 6a is constructed as above described. Ten kinds of signals are taken out from this circuit. They will be denominated as shown in the right end of FIG. 10. The output signal of the second acceleration signal generator 65a is denominated as $b_2$VR, that of the first accelerator signal generator 64a as $b_1$VR, that of the AND gate 84a as EVVR, those of the OR gates 85a and 176a as EAVR and AVVR, respectively, that of the OFF delay timer 86a as AVZVR, that of the counter 188a as CEVR, that of the deceleration signal generator 63a as bVR, that of the AND gate 181a as PLVR, and that of the slip signal generator 172a as $\lambda$VR. The letter "V" means "front side", and the letter "R" means "right side".

The judge circuits for the left rear wheel 11b, the left front wheel 6b and the right rear wheel 11a are constructed in the similar manner, respectively. The ten kinds of signals +$b_2$HL, +$b_1$HL, EVHL, EAHL, AVZHL, AVHL, CEHL, PLHL, −bHL and $\lambda$HL are taken out from the judge circuit for the left rear wheel 11b, where the letter "H" means "rear side" and the letter "L" means "left side". Similarly +$b_2$VL, +$b_1$VL, EVVL, EAVL, AVZVL, AVVL, CEVL, PLVL, −bVL and $\lambda$VL, and +$b_2$HR, +$b_1$HR, EVHR, EAHR, AVZHR, AVHR, CEHR, PLHR, −bHR and $\lambda$HR are taken out from the judge circuits for the left front wheel 6b and the right rear wheel 11a, respectively.

Next, the details of the selection part 31B of the control unit 31' will be described with reference to FIG. 11.

The selection part 31B is constructed symmetrically with respect to the rear wheels 11a and 11b. The output signals EVHR, EVHL, AVZHR, AVZHL (negations of the AVZHR, AVZHL, respectively), CEHR, CEHL, AVHR, AVHL, EAHR and EAHL from the judge part 31A are supplied to the selection part 31B. The output signals EVHR and EVHL are supplied to one input terminals of AND gates 190a and 190b, respectively and input terminals of an OR gate 193. The output signals $\overline{\text{AVZHR}}$ and $\overline{\text{AVZHL}}$ are supplied to one input terminals of OR gate 91a and 91b, respectively. The output signals CEHR and CEHL are supplied to other input terminals of the OR gates 91a and 91b. Output terminals of the OR gates 91a and 91b are connected to reset terminals $R_1$ and $R_2$ of flip-flops 89a and 89b, respectively.

The flip-flops 89a and 89b are of the D-type. The output signals AVHR and AVHL are supplied to set terminals $S_1$, $S_2$ of the flip flops 89a and 89b, and they are further supplied to an OR gate 96.

The output signals EAHR and EAHL are negated, and then supplied to clock terminals $C_1$, $C_2$ of the flip-flops 89a, 89b. Output terminals $Q_1$, $Q_2$ of the flip-flops 89a, 89b are connected to other input terminals of the AND gate 90a, 90b. Negation output terminals $\overline{Q_1}$, $\overline{Q_2}$ are connected to data terminals $D_2$ and $D_1$ of other flip-flops 89b and 89a, and further they are connected to input terminals of an AND gate 92. An output terminal of the OR gate 193 is connected to the remaining one input terminal of the AND gate 92. Output terminals of the AND gates 190a, 190b, 92 are connected to input terminals of an OR gate 194, respectively. An output terminal of the OR gate 194 is connected to one input terminal of an AND gate 95. An output terminal of the OR gate 96 is connected to another negation input terminal of the AND gate 95. Output terminals of the AND gate 95 and OR gate 96 are connected to input terminals of an OR gate 97, respectively.

The output signals EVHR and EVHL are further supplied to one negation input terminals of AND gates 98a and 98b, and to other input terminals of the other AND gates 98b and 98a. Output terminals of the AND gates 98a and 98b are connected to a set terminals of a flip flop 250, and a reset terminal R thereof. A signal SLA is obtained from an output terminal Q of the flip-flop 250, and it is supplied to the subsequent logic part 31C. An output f of the AND gate 95 is denominated as EVH, that g of the OR gate 97 as EAH, and that e of the OR gate 96 as AVH. They are supplied to the subsequent logic part 31C. Thus, first select-low control signals EVH, EAH and AVH are formed from the judge results of the skid conditions of both of the rear wheels 11a and 11b.

Next, the logic part 31c of the control unit 31' will be described in detail with reference to FIG. 12.

The logic part 31C is constructed in nearly symmetrical manner with respect to the right and left wheels.

The input signals CEVL, CEVR, AVZVL, AVZVR, EVVL, EVVR, AVVL, AVVR, EAVL, EAVR, CEHL, CEHR, AVHL, AVHR, PLHL, PLHR, PLVL, PLVR are supplied from the judge part 31A. And the input signals EVH, AVH, EAH and SLA are supplied from the selection part 31B.

The signals CEVL and CEVR are supplied to one input terminals of OR gates 205a and 205b. The signals AVZVL and AVZVR are supplied to another negation input terminals of the OR gate 205a and 205b. Output terminals of the OR gates 205a and 205b are connected to reset terminals of flip-flops 201a and 201b. The signals EVVL and EVVR are supplied to one input terminals of AND gates 203a, 203b and OR gates 207a and 207b.

The signals AVVL and AVVR are supplied to set terminals S of the flip-flops 201a and 201b, and one input terminals of OR gates 211a and 211b. The signals EAVL and EAVR are negated and then supplied to clock terminals C of the flip-flops 201a and 201b. Output terminals Q of the flip-flops 201a and 201b are connected to other input terminals of the AND gates 203a and 203b. $\overline{Q}$ terminals of the flip-flops 201a and 201b are connected to first input terminals of AND gates 208a and 208b, and further to data terminals D of other flip-flops 202a and 202b. Similarly, Q terminals of the flip-flops 202a and 202b are connected to data terminals D of the other flip-flops 201a and 201b, and they are connected to third input terminals of the AND gates 208a and 208b. Output terminals of the OR gates 207a and 207b are connected to second input terminals of the AND gates 208a and 208b.

The signals AVHL and AVHR are supplied to set terminals S of the flip-flops 202a and 202b. Q output terminals of the flip-flops 202a and 202b are connected to one input terminals of AND gates 204a, 204b and 212a and 212b. Further, they are connected to third input terminals of the OR gates 206b and 206a. Output terminals of the AND gates 204a and 204b are connected to third input terminals of OR gates 209a and 209b. Output terminals of the AND gates 203a, 203b and 208a, 208b are connected to first and second input terminals thereof, respectively.

Output terminals of the AND gates 212a and 212b are connected to other input terminals of the OR gate 211a and 211b. Output terminals of the OR gates 209a, 209b and 211a, 211b are connected to one input terminals of AND gates 210a and 210b, and to other negation input terminals thereof.

The signals AVHL and AVHR are further connected to third input terminals of AND gates 213b and 213a. The signals PLHL, PLVL and PLHR, PLVR are supplied to first and second input terminals of the AND gates 213a and 213b, respectively. Output terminals of the AND gates 213a and 213b are connected to second input terminals of the OR gates 206a and 206b. The signals CEHL and CEHR are supplied to first input terminals of the OR gates 206a and 206b.

The signal EVH is supplied to one input terminals of AND gates 214a and 214b, and further to the other input terminals of the OR gates 207a and 207b. Output terminals of the AND gates 214a and 214b are connected to the other input terminals of the OR gates 207a and 207b. The signal SLA, as it is, is supplied to another input terminal of the one AND gate 214a, while the signal SLA is negated, and then supplied to another input terminal of the other AND gate 214b. The signal AVH is supplied to other input terminals of the AND gates 212a and 212b. And the signal EAH is negated and then supplied to clock terminals C of the flip-flops 202a and 202b.

In the above-described manner, the first select-low control signals are logically combined with the judge results of the front wheel running on the frictionally low side of the road, to form second select-low control signals.

Output signals EV' and EV of the AND gates 210a and 210b at the last stage of the logic part 31C correspond to the control signals Sb, Sa of the current level "½", and they are supplied to the solenoid portion 30b and 30a of the change-over valves 4b' and 4a' in FIG. 9, respectively. Output signals AV' and AV of the OR gates 211a and 211b at last stage of the logic part 31C correspond to the control signals Sb, Sa of the current level "1", and they are supplied to the solenoid portions 30b and 30a of the change-over valves 4b' and 4a' in FIG. 9, respectively.

Figure 12:
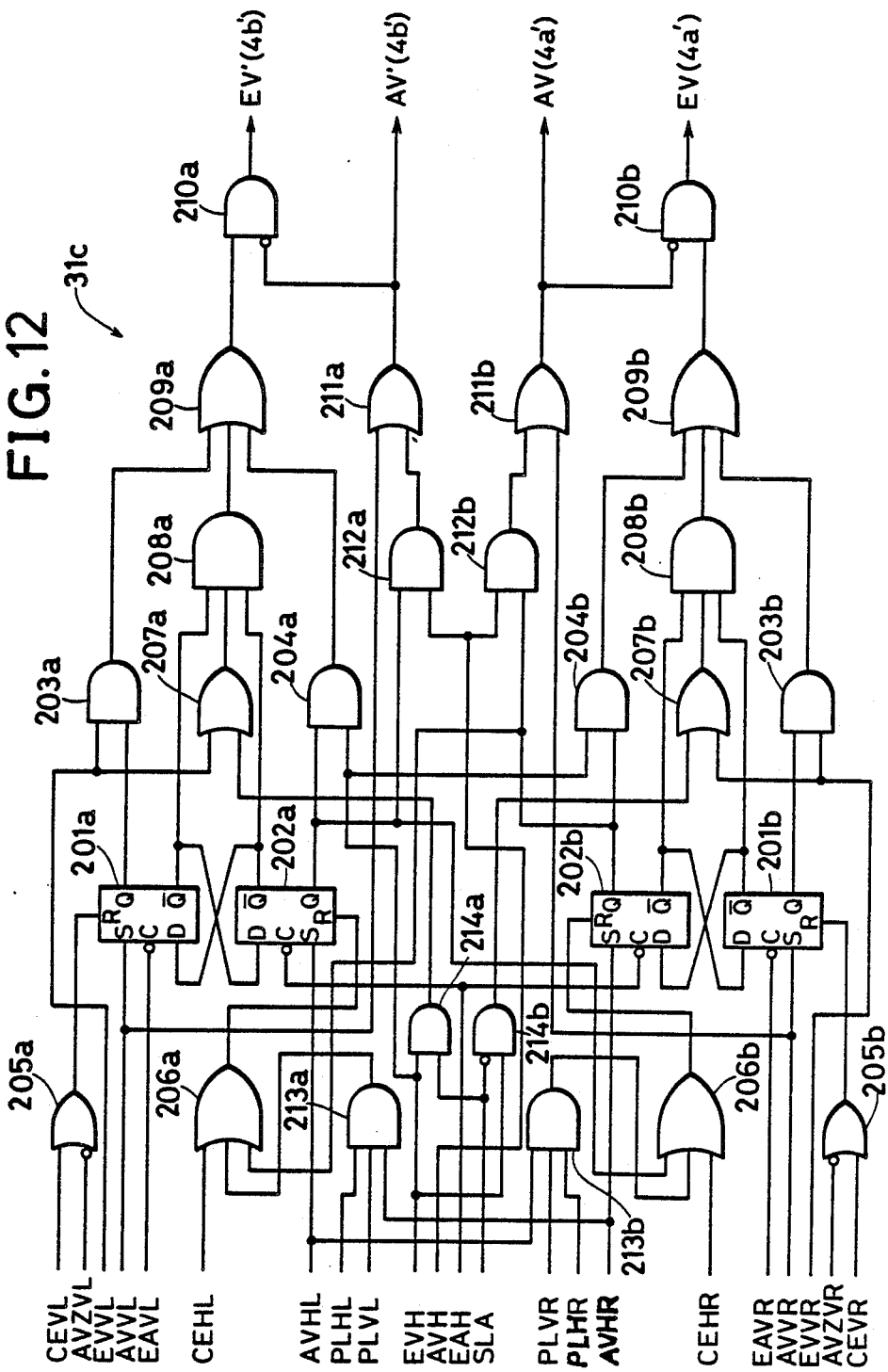
FIG. 12 is a circuit diagram of a logic part in FIG. 9.

Although not shown in FIG. 12, the logic part 31C includes a motor drive circuit shown in FIG. 13. It consists of an OR gate 145 and an amplifier 146 connected to an output terminal of the OR gate 145. The signals AVZVR, AVZHL, AVZVL and AVZHR are supplied to input terminals of the OR gate 145. An output Qo of the amplifier 146 is supplied to the motor 22 in FIG. 9.

Next, there will be described operations of the above described anti-skid apparatus.

It is now assumed that both of the conduit systems are in order, and the wheels 6a, 6b, 11a and 11b run on the road which is uniform in frictional coefficient.

The vehicle driver treads the brake pedal 2. At the beginning of the braking, the control signals Sa and Sb are "0" from the control unit 31'. Accordingly, the valve devices 4a' and 4b' are in the A-position. Pressurized fluid is supplied from the master cylinder 1 to the wheel cylinders 7a and 7b of the front wheels 6a and 6b through the conduits 3, 16, the valves devices 4'a, 4'b and the conduits 5, 17. Further, it is supplied to the wheel cylinders 12a and 12b of the rear wheels 11a and 11b through the conduits 13 and 15 and the proportioning valves 32a and 32b. Thus, the wheels 6a, 6b, 11a and 11b are braked.

When the deceleration or slip ratio of the wheels 6a, 6b, 11a and 11b becomes higher than the predetermined deceleration or slip ratio with the increase of the brake fluid pressure, the control signals Sa and Sb become high level "1" or middle level "½". The solenoid portions 30a and 30b are energized.

Although operations of the control unit 31' according to this invention will be described hereinafter, first operations of the valve apparatus will be described at the control signals Sa, Sb = "1" and "½".

When the control signals Sa, Sb become "1", the valves 4'a and 4'b take the third position C. The conduits 3 and 16 are interrupted from the conduits 5 and 17, respectively. However, the conduits 5 and 17 are made to communicate with the conduits 60a and 60b. The pressurized fluid is discharged from the wheel cylinders 7a and 7b of the front wheels 6a and 6b into the hydraulic reservoirs 25a and 25b through the conduits 5, 17, 60a and 60b. The pressurized fluid from the wheel cylinders 12a and 12b of the rear wheels 11a and 11b is discharged through the conduits 15, 13, and the conduits 17, 5, 60b and 60a, into the hydraulic reservoirs 25a and 25b. Thus, the brakes of the wheels 6a, 6b, 11a and 11b are relieved.

When the control signals Sa and Sb become middle level "½", the valves 4a and 4b take the second position B. The conduits 3, 16 are interrupted from the conduits 5, 17. Further, the conduits 5, 17 are interrupted from the conduits 60a, 60b. Thus the brake fluid pressure of the wheel cylinders 7a, 7b, 12a and 12b are maintained at constant. The fluid pressure pumps 20a and 20b continue to supply brake fluid towards the conduits 3 and 16.

When the skid conditions of the wheels 6a, 6b, 11a and 11b are removed, the control signals Sa and Sb become again low level "0". The valves 4a' and 4b' take the position A. The master cylinder side is made to communicate with the wheel cylinder side. The braking forces to the wheels 6a, 6b, 11a and 11B again increases.

Hereafter, the above-described operations are repeated. When the running speed of the vehicle reaches the desired speed, or when the vehicle stops, the brake pedal 2 is released from treading. The brake fluid is returned from the wheel cylinders 7a, 7b, 12a, 12b to the master cylinder 1 through the conduits, the valves 4'a, 4'b, the check valves 19a and 19b. Thus, the brake is relieved.

In the above description, the control signals Sa and Sb become "0", "1" or "½" at the same time. However, when the frictional coefficients of the road are considerably different at the right and left sides, the control signals Sa and Sb do not become "0", "1", or "½" at the same time. For example, when the frictional coefficient of the right side of the road is relatively small, the control signal Sa first becomes "1". Next, such a case will be described.

The operations at the beginning of the braking are the same as above described. When the control signal Sa becomes "1", the valve 4'a takes the position C. Pressurized fluid is discharged into the reservoir 25a from the wheel cylinders 7a and 12b.

On the other hand, the brake fluid continues to be supplied to the wheel cylinders 7b and 12a from the master cylinder 1.

When the control signal Sa becomes "½", the fluid pressures of the wheel cylinders 7a and 12b of the front and rear wheels 6a and 11b are maintained at constant. And when the other control signal Sb is still "0", the fluid pressures of the wheel cylinder 7b of the other front wheel 6b continues to rise.

Next, operations of the control unit 31' according to this invention will be described.

It is now assumed that the frictional coefficient of the right side is smaller (low side). The brake pedal 2 is trodden. At time t1, the right rear wheel 11a reaches the predetermined deceleration, and so the signal -b is generated from the deceleration signal generator corresponding to the deceleration signal generator 63a of FIG. 10 in the judge circuit for the right rear wheel 11a. Although FIG. 10 shows the judge circuit for the right front wheel 6a, the same reference symbols will be hereinafter used for the corresponding elements or circuit blocks for the convenience of the description.

The signal -b is supplied to the OR gate 71a, and the movable contact of the change-over circuit 70a is changed over to the output side of the multiplier 67, by the output of the OR gate 71a. The signal -b is further supplied to the third input terminal of the OR gate 82a. The output of the OR gate 82a generates the output signal EVHR through the AND gates 83a and 84a, and further the output signal EAHR through the OR gate 85a.

Figure 14:
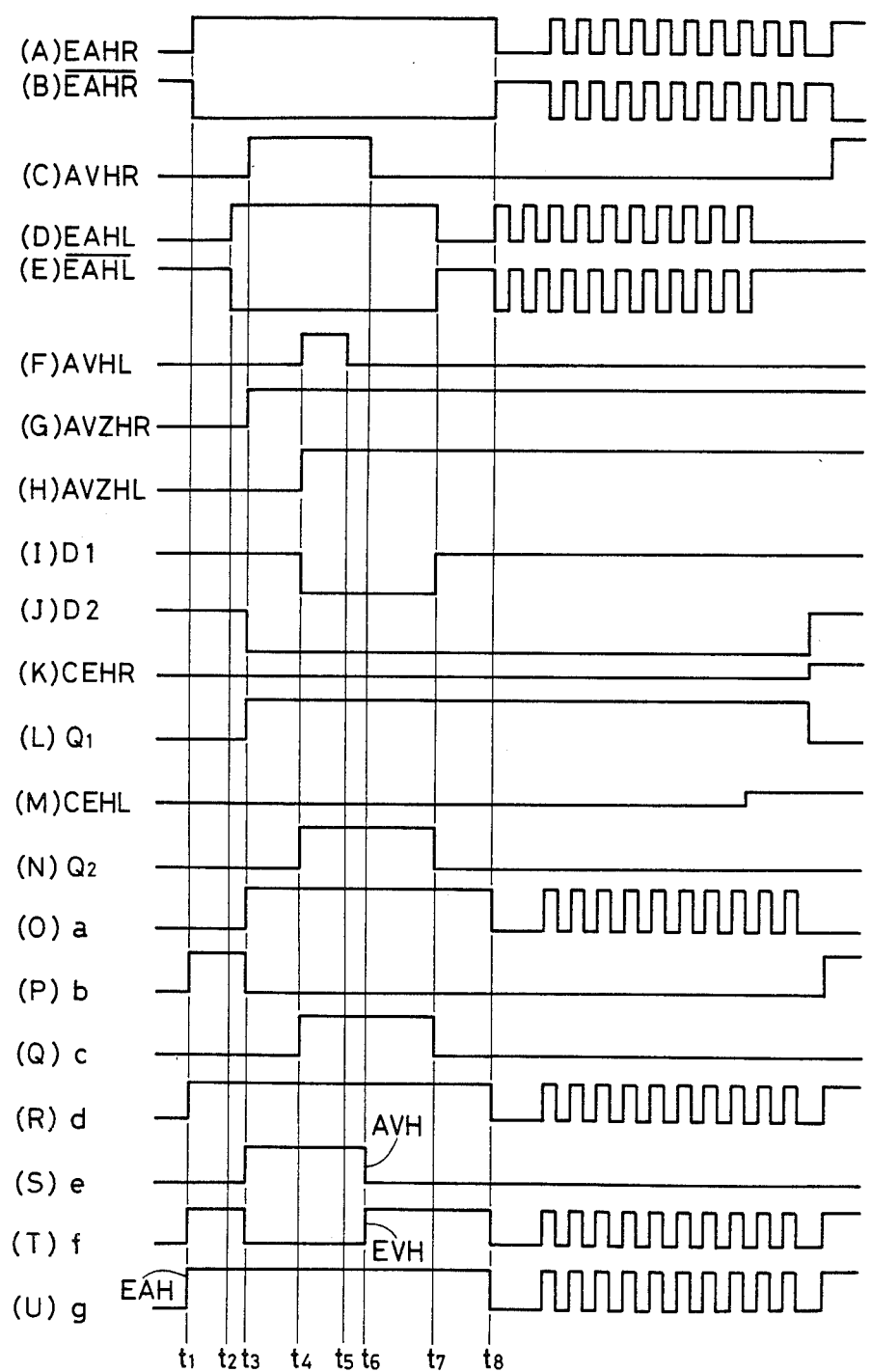
FIG. 14 is graphs for explaining operations of the second embodiment of this invention.

As shown in FIG. 14(A), the signal EAHR becomes "1" at time t1. In FIG. 11, the $Q_1$, $Q_2$ outputs of the flip-flops 9a, 89b are "1", and the signal EVHR is now supplied to the AND gate 92. Accordingly, the output b of the AND gate 92 becomes "1", and so both of the outputs d and f of the OR gate 194 and AND gate 95 become "1". Thus, the signal EVH becomes "1". Thus, at time t1, the outputs b, d and f becomes "1", as shown in FIG. 14 P.R.T. Accordingly, the output g of the OR gate 97 becomes "1". Thus, the signal EA becomes "1", in FIG. 11.

Figure 11:
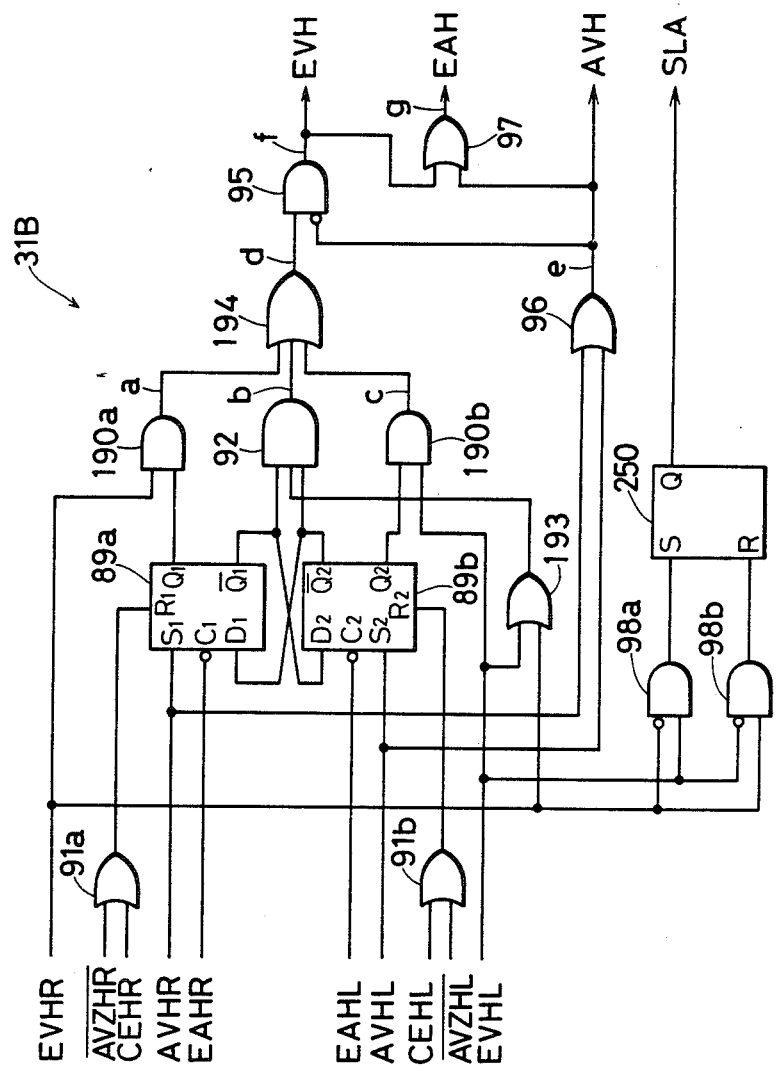
FIG. 11 is a circuit diagram of a selection part in FIG. 9.

Further, in FIG. 11, the signal EVHR is supplied to the

AND gates 98a and 98b. Since the signal EVHL is still "0", the output of the AND gate 98b becomes "1", while that of the other AND gate 98a remains "0". Accordingly, the signal SLA remains "0". The right side of the road is judged to be "low side", by that fact.

In FIG. 12, the signal EVH is supplied to the one input terminal of the AND gate 204a. However, since the Q output of the flip-flop 202a to the other input terminal of the AND gate 204a is still "0", the output of the AND gate 204a is "0". The signal EVH is supplied to the input terminal of the AND gate 204b, too. However, since the Q output of the flip-flop 202b is similarly "0", also the output of the AND gate 204b is "0".

The signal EAH is supplied to the negation clock terminals C of the flip-flops 202a, 202b. However, since it is negated, the Q outputs of the flip-flops 202a, 202b remain "0".

The signal SLA is supplied to the AND gates 214a, 214b, and it is now "0". The negated signal SLA is supplied to the one AND gate 214b. Accordingly, the output of the AND gate 214b becomes "1", and therefore, the output of the OR gate 207b becomes "1". The input to the second input terminal of the AND gate 208b becomes "1". Since the Q outputs of the flip-flops 201b, 202b are "1", the output of the AND gate 208b becomes "1". The output of the OR gate 209b, therefore that of the AND gate 210b becomes "1". Thus, the output signal EV becomes "1". Accordingly, the control signal Sa of the current level "½" is supplied to the solenoid portion 30a of the change-over valve 4a'. Thus, the braking forces to the right front wheel 6a and rear wheels 11a, 11b are maintained at constant. The lock apparatus 47 functions.

At time t2, the rear wheel 11b on the "high side" of the road reaches the predetermined deceleration. The signal EVHL, therefore, EAHL is generated, as shown in FIG. 14 (D). It is supplied to the other input terminal of the OR gate 193. The signal EVHR is already supplied to the other input terminal of the OR gate 193. Since it is maintained, the output of the OR gate 193, therefore, that b of the AND gate EAH are unchanged as "1", as shown in FIG. 14 (D)(R)(T)(U). The output of the AND gate 98b becomes "0". However, the output of the other AND gate 98a remains "0". Accordingly, the Q output of the flip-flop 250 remains "0". Thus, the right side of the road is judged surely to be still "low side".

At time t3, the right rear wheel 11a generates the signal AVHR as shown in FIG. 14(C). It reaches the predetermined slip. The slip signal λ is generated from the slip signal generator 172a of the judge circuit for the right rear wheel 11a. It is supplied to the one input terminal of the AND gate 173a. Since the first acceleration signal $+b_1$ are not generated, the output of the AND gate 173a becomes "1". Thus, the signal AVHR is generated. At the same time, the output of the AND gate 84a or signal EVHR becomes "0". However, the output of the OR gate 85a or the signal EAHR continues to be "1", as shown in FIG. 14(A). In FIG. 11, the signal SLA remains "0".

Figure 10:
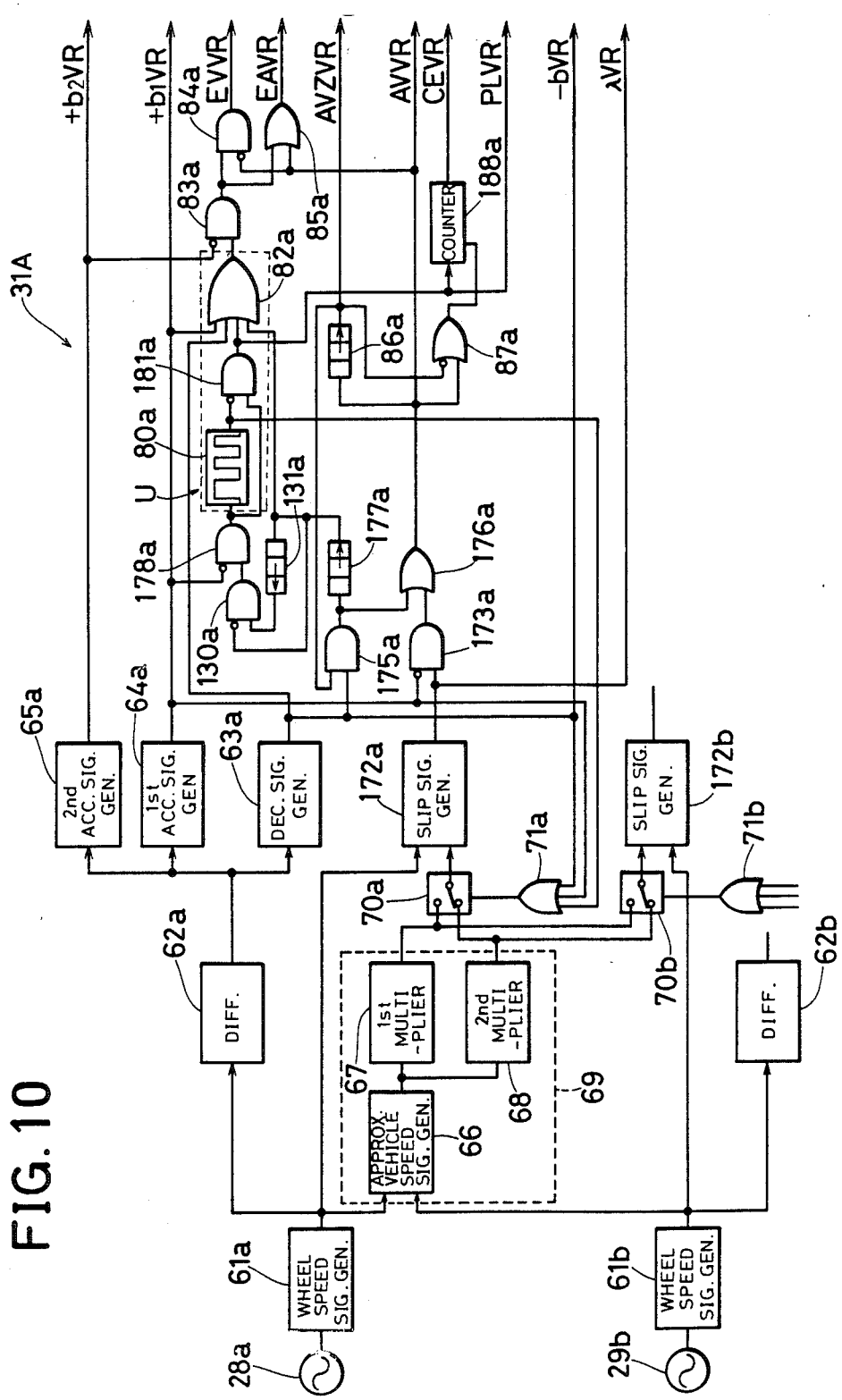
FIG. 10 is a circuit diagram of a judge part in FIG. 9.

In FIG. 10, the slip signal is supplied to the OFF delay timer 86a. The output of the OFF delay timer 86a is supplied to the one input terminal of the AND gate 175a. Accordingly, hereinafter when the deceleration signal-b is generated, the output of the AND gate 175a, therefore that of the OR gate 176a becomes "1". Thus the signal AVHR is generated. Further also after the signal -b disappears, the output of the OFF delay timer 177a connected to the output terminal of the AND gate 175a is maintained at the level "1" for the delay time of the OFF delay timer 177a.

The output of the OR gate 176a is supplied to the OFF delay timer 86a. Accordingly, the signal AVZHR is generated as shown in FIG. 14. In FIG. 13, the motor drive signal Qo is generated from the amplifier 146. The motor 22 starts to be driven in FIG. 9.

In FIG. 11, the signal AVHR is supplied to the set terminal $S_1$ of the flip-flop 89a. The $Q_1$ output thereof becomes "1". The $Q_1$ output thereof becomes "0". Accordingly, the input to the data terminal D2 of the other flip-flop 89b, as shown in FIG. 14. The output of the OR gate 96, therefore the signal AVH is generated as shown in FIG. 14.S. The signal EVH becomes "0". However, the signal EAH continues to be "1", as shown in FIG. 14U.

In FIG. 12, the signal AVHR is supplied to the set terminals of the flip-flop 202b. The Q output thereof becomes "1", and it is supplied to the one input terminal of the AND gates 204b, and 212b. The input signal EVH to the other input terminal of the AND gate 204b is "0", while the input signal AVH to the other input terminal of the AND gate 212b are "1". Accordingly, the output of the AND gate 204b remains "0", while that of the AND gate 212b becomes "1". The output signal AV is obtained. Thus, the control signal Sa of the current level "1" is supplied to the solenoid portion 30a of the change-over valve 4a' in FIG. 9. Thus, the brakes of the right front wheel 6a and rear wheels 11b are relieved. The Q output of the one flip-flop 202b is "1", while that of the other flip-flop 202a is "0". Now the right side of the road is judged to be "low side" by that fact.

At time t4, the other rear wheel 11b reaches the predetermined slip during the continuation of the signal AVHR as shown in FIG. 14C. Thus, the signal AVHL is generated as shown in FIG. 14F. In FIG. 11, it is supplied to the set terminal S2 of the flip-flop 89b. Accordingly, the Q2 output thereof becomes "1" and the Q2 output thereof becomes "0". Thus, the input to the data terminal D1 of the flip-flop 89a becomes "0" as shown in FIG. 14I.

The signal AVHL is supplied to the one input terminal of the OR gate 96, too. Since the signal AVHR continues to be supplied to the other input terminal of the OR gate 96, the signal AVH remains "1". In FIG. 12, the signal AVHL is supplied to the set terminal S of the flip-flop 202a. However, since the Q output of the flip-flop 202b is supplied through the OR gate 206a to the reset terminal R of the flip-flop 202a, the Q output of the flip-flop 202a remains "0" due to the reset priority. Thus, the output of the AND gate 212a remains "0". The output signal AV for the left side is not generated. The brake of the left front wheel 6b is not relieved. However, when the left front wheel 6b generates the signal AVVL, it is independently controlled for brake relief, since the signal AVVL is supplied to the OR gate 211a. Thus, the braking distance can be much shortened with the arrangement of this embodiment of the invention.

The signal AVZHL becomes "1" with the signal AVHL, as shown in FIG. 14. However, since the AVZHR has become "1", the output of the OR gate 145 has become "1". The output Qo is not influenced, and remains "1". The motor 22 continues to be driven. At time t5, the signal AVHL becomes "0". However, it has no influence on the other signals.

At time t6, the slip signal λ of the right rear wheel 11a disappears. Accordingly, the signal AVHR becomes "0" as shown in FIG. 14C. In FIG. 10, the input to the one input terminal of the OR gate 85a becomes "0". However, after the signal -b disappears, the output of the OR gate 82a is still "1" because of the delay time of the OFF delay timer 177a. Accordingly, the output of the AND gate 84a, therefore the signal EVHR becomes again "1" with the disappearance of the signal AVHR. The output to the OR gate 85a, therefore the signal EAHR continues to be "1" as shown in FIG. 13A.

In FIG. 11, the signal AVHR becomes "0". However, since the output of the OR gate 91a is still "0", the flip-flop 89a is not reset, but the Q output thereof remains "1" as shown in FIG. 14L. The signal EVHR is still "1". Accordingly, the output a of the AND gate 190a remains "1", as shown FIG. 14o. The output e of the OR gate 96 becomes "0". Accordingly, the output f of the AND gate 95, therefore the signal EVH becomes again "1" from "0" as shown in FIG. 13T. The output signal EAH of the OR gate 97 remains "1".

In FIG. 12, the input to the set terminals of the flip-flop 202b becomes "0". However, since the input to the reset terminal R thereof is "0", the Q output thereof remains "1". Since the signal EVH becomes again "1", the output of the AND gate 204b, therefore that of the OR gate 209b becomes "1". On the other hand, the input AVH to the one input terminal of the AND gate 212b becomes "0". Accordingly, the output thereof becomes "0", and the output signal AV disappears. With the disappearance of the output signal AV, the other output signal EV becomes "1". In FIG. 9, the change-over valve 4a' is changed over to the position B, and the braking forces to the right front wheel 6a and the rear wheels 11b are maintained at constant.

In FIG. 10 when the deceleration signal -b disappears, and the delay time of the OFF delay timer 131a lapses, the input to the fourth input terminal of the OR gate 82a becomes "0". However, it is assumed that the left rear wheel 11b reaches the predetermined first acceleration before the lapse of the delay time of the OFF delay timer 177a. Accordingly, the input to the first input terminal of the OR gate 82a becomes "1", and the signal EAHL continues to be "1" as shown in FIG. 14D, as long as the first acceleration signal $+b_1$ is generated, although the output of the OFF delay timer 177a becomes "0". At time t7 when the first acceleration signal $+b_1$ disappears, the signal EAHL becomes "0".

In FIG. 11, the input to the clock terminal C2 of the flip-flop 89b becomes "0". It is inverted or negated and supplied to the clock terminal C2. The input "0" is supplied to the data terminal D2, and it is read out with the negated input to the clock terminal C2. Thus, the Q2 output becomes "0" as shown in FIG. 14N. Accordingly, the Q2 output becomes "1". The Q1 output of the other flip-flop 89a remains "0". Accordingly, the output b of the AND gate 92 remains "0". The output c of the AND gate 190b becomes "0" with the disappearance of the Q2 output of the flip-flop 89b, as shown in FIG. 14Q.

On the other hand, the Q1 output of the flip-flop 89a remains "1", and the right rear wheel 11b still generates the signal EVHR. Accordingly, the output a of the AND gate 190a continues to be "1", and the signal EVH remains "1" as shown in FIG. 14T.

In FIG. 10, as soon as the first acceleration signal $+b$, disappears, the pulse generator 80a is driven for the delay time of the OFF delay timer 79a. The signal EAHL, and EAHL are changed pulse-likely as "1", "0", "1", "0", . . . , as shown in FIG. 14D, from time t8. In FIG. 11, the one input to the OR gate 193 and the one input to the AND gate 190b are changed pulse-likely. However, the Q2 output of the one flip-flop 89b is "0", and the Q1 output of the other flip-flop 89a is "0". Accordingly, the output EAH of the OR gate 97, and the output EVH of the AND gate 95 are not changed pulse-likely, but they continue to be "1" with the signal EVHR. Accordingly, the braking forces to the right front wheel 6a and rear wheels 11a, 11b are still maintained at constant.

When the right rear wheel 11b generates the first acceleration signal +b, after time t7, the signal EVHR and EAHR continue to be "1" although the delay time of the OFF delay timer 177a. The braking forces to the right front wheel 6a and rear wheels 11a, 11b are still maintained at constant. However, at time t8 when the first acceleration signal $+b_1$, disappears, the pulse generator 80a is driven, and the signal EAHR are changed pulse-likely as shown in FIG. 14A. Thus, in FIG. 11, the signals EVH and EAH are pulse-likely changed.

Accordingly, in FIG. 11, the output of the AND gate 204b are changed pulse-likely.

The braking force to the right front wheel 6a and rear wheels 11b are stepwisely increased.

When the counted pulses reach the predetermined value, the output CEHR of the counter 188a (in FIG. 10) in the judge circuit for the right rear wheel 11a becomes "1". Accordingly, in FIG. 11, the input of the third input terminal of the OR gate 206b becomes "1". The output of the OR gate 206b is supplied to the reset terminal R of the flip-flops 202b to reset the latter. The Q output thereof becomes "0". Although the pulses continue, the stepwise increase of the braking forces is stopped. When the Q output of the flip-flop 202b becomes "0", the other flip-flop 202a is released from the reset condition.

Hereafter, if the right side of the road is still "low side", the above operations are similarly repeated. When the "low side" is inverted on the road, or when the left side of the road becomes "low side", operations similar to the above described operations for the right front wheel 6a and left rear wheels 11b are effected for the left front wheel 6b and right rear wheels 11a.

Further the "low side" is so designed as to be changed over in the case that the rear wheel 11b running on the "high side" generates the brake relieving signal or pressure decreasing signal AVHL while both of the braking forces to the front and rear wheels 6a, 11a, are stepwisely increased. In FIG. 12, while the signals PLVR and PLHR (outputs of the pulse generators 80a) are changed as "1", "0", "1", . . . , the signal AVHL becomes "1". The output of the AND gate 213b therefore that of the OR gate 206b becomes "1", and it is supplied to the reset terminal R of the flip-flop 202b. The Q output thereof becomes "0". Accordingly, the output of the OR gate 206a becomes "0", and the input to the reset terminal R of the flip-flop 202a becomes "0". On the other hand, the signal AVHL is supplied to the set terminals of the flip-flop 202a. The Q output thereof becomes "1". Thus, the "low side" is changed over.

According to a first modification of this embodiment, the "low side" is changed over in the case that the rear wheel 11b on the "high side" generates continuously the pressure decreasing signal AVHL for a longer time than a predetermined time, while the rear wheel 11a on the "low side" is rotating in the stable region or condition of the "$\mu$-slip characteristics". In order to obtain such an operation, a circuit as shown in FIG. 15 is added to the circuit of FIG. 12.

In FIG. 12, the signals AVHL and AVHR are supplied to the set terminals S of the flip-flops 202a, 202b. Referring to FIG. 15, they are further supplied through ON delay timers 133a and 133b to one input terminals of AND gates 132a and 132b, respectively. The signals AVZHL, AVZHR are supplied to first input terminals of AND gates 132a, 132b, the signals -bHL, -bHR to second negation input terminals thereof, the signals $+b_1HL$, $+b_1HR$ to third negation input terminals thereof, and the signals $\lambda HL$, $\lambda HR$ to fourth negation input terminals thereof. Output terminals of the AND gates 132a, 132b are connected to one input terminals of OR gates 124a, 124b. Negations of the signals AVZHL, AVZHR or the signals AVZHL, AVZHR are supplied to other input terminals of the OR gates 124a, 124b.

The definition of "the stable region of the $\mu$-slip characteristics" is described, for example, in the "these of automobile technology society" 133 page, No. 31, 1985. The "stable region" means that the wheel is rotating at smaller slip rates than the slip rate at the maximum of $\mu$-value (frictional value) in the slip rate-frictional coefficient $\mu$ characteristics. According to this modification, the case that none of slip signal, first acceleration signal +b, deceleration signal -b occur, is used as sure "stable region".

When the rear wheel on the low side already generates the signal AVZHR or the anti-skid control has been effected, and when the rear wheel 11a on the low side is rotating in the stable region, the output of the AND gate 132b is "1". Accordingly, the input to the one input terminal of the AND gate 123b of the output stage is "1". When the rear wheel 11b on the high side generates continuously the signal AVHL for a longer time than the delay time of the ON delay timer 133a, the input to the other input terminal of the AND gate 123b becomes "1", and so the output thereof becomes "1". Accordingly the flip-flops 202b in FIG. 11 is reset, while the other flip flop 202a is released from the reset condition and set with the signal AVHL. The Q output of the flip-flop 202a becomes "1". Thus, the "low side" is changed over.

According to a second modification of this embodiment, the "low side" is changed over in the case that the rear wheel 11a on the low side is rapidly accelerated, and so generates the second acceleration signal $+b_2HR$, while the rear wheel 11b on the high side generates the pressure decreasing signal AVHR. Or the "Low side" is changed over in the case that the rear wheel 11b on the high side generates continuously the pressure decreasing signal AVHL for a longer time than a predetermined time, while the pressure decreasing signal AVHR of the rear wheel 11a on the low side disappears.

Figure 16:
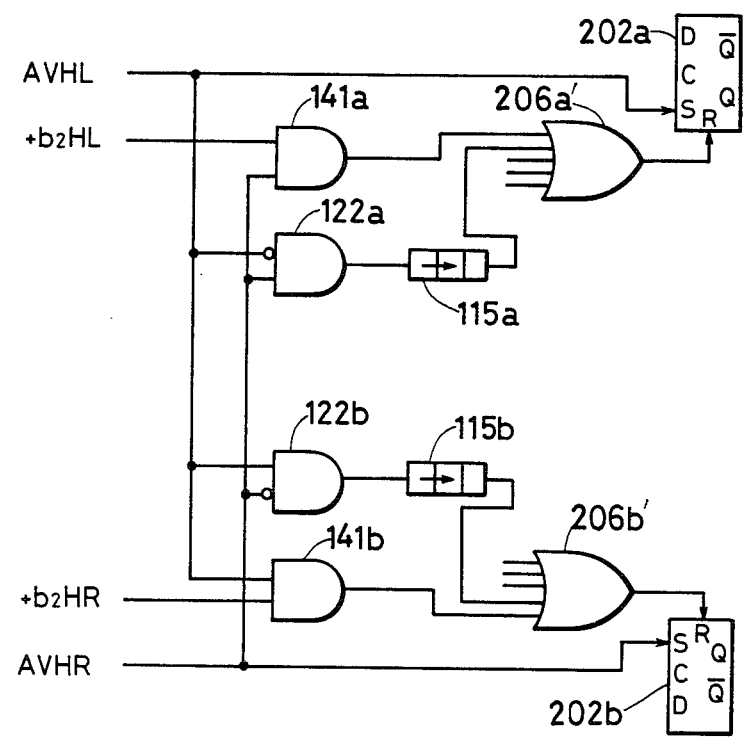
FIG. 16 is a circuit diagram of an important part of a second modification of the logic circuit of FIG. 12.

FIG. 16 shows the second modification. Other parts are the same as the circuit of FIG. 12. In FIG. 16, the signals AVHL and AVHR are supplied to one negation input terminals of AND gates 122a and 122b, respectively. Further, they are supplied to other input terminals of the other AND gates 122b and 122a, and one input terminals of AND gates 141b and 141a.

The signals $+b_2HL$ and $+b_2HR$ are supplied to other input terminals of the AND gates 141a and 141b. Output terminals of the AND gates 141a and 141b are connected to fifth input terminals of the OR gates 206a' and 206b'. Output terminals of the AND gates 122a and 122b are connected through ON delay timers 115a and 115b to fourth input terminals of the OR gates 206a' and 206b'.

In FIG. 16, the rear wheel 11b on the high side generates the brake relieving signal AVHL. During the generation of the signal AVHL, the rear wheel 11a is rapidly accelerated, and generates the second acceleration signal $°b_2HR$. The output of the AND gate 141b becomes "1". Accordingly, that of the OR gate 206b' becomes "1" to reset the flip-flop 202b. On the other hand, the other flip-flop 202a is set with the signal AVHL. The Q output thereof becomes "1". Thus, the "low side" is changed over.

When the rear wheel 11b on the high side generates continuously the brake relieving signal AVHL for a longer time than the delay time of the ON delay timer 115b during the time that the brake relieving signal AVHR of the rear wheel 11a on the low side disappears the output of the ON delay timer 115b becomes "1". Accordingly, the output of the OR gate 206b' becomes "1", and resets the flip-flop 202b. On the other hand, the other flip-flop 202a is released from the reset condition, and it is set with the signal AVHL. Thus, the "low side" is changed over.

According to the second modification, as described with reference to FIG. 16, the low side is changed over in the case that the rear wheel 11b on the high side generates continuously the brake relieving signal AVHL for a longer time than the predetermined time during the time that the brake relieving signal AVHR of the rear wheel 11a on the low side disappears. The above described predetermined time is made the delay time set in the ON delay times 115a, 115b, in the second modification.

However, the predetermined time may be changed in accordance with the generating time of the brake relieving signal of the rear wheel 11a on the low side in the last control cycle.

Figure 17:
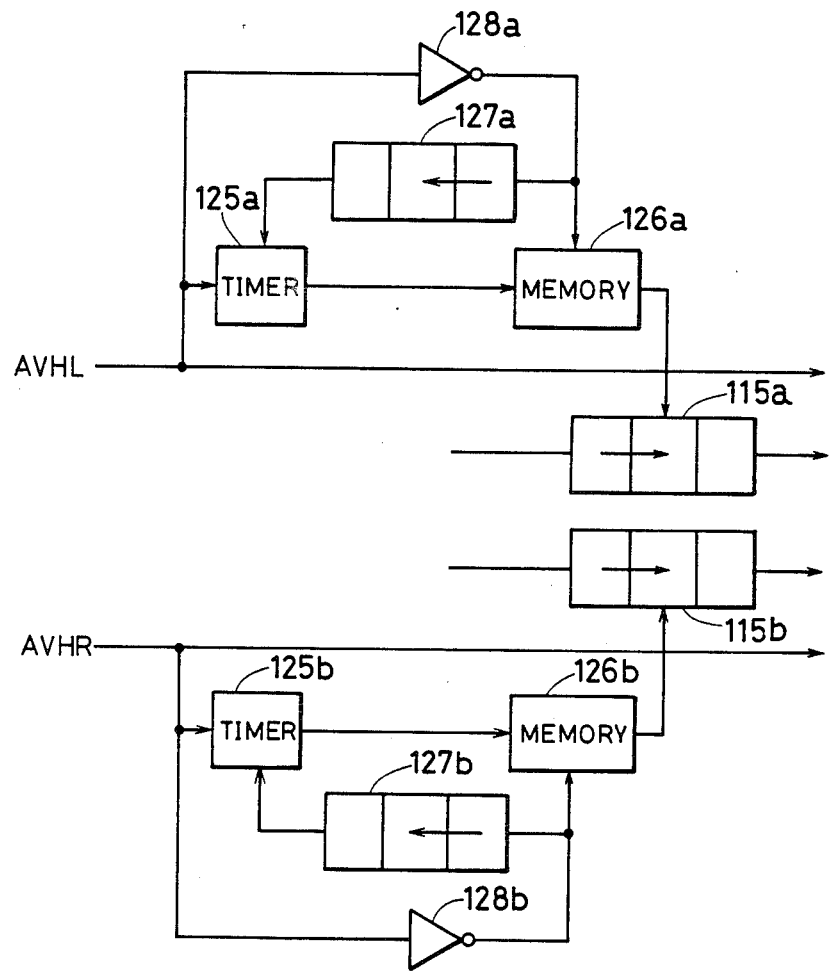
FIG. 17 is a circuit diagram of an important part to a third modification of the logic circuit of FIG. 12.

FIG. 17 shows such a third modification of this embodiment. Other parts are the same as the circuit of FIG. 12 and FIG. 16.

In this modification, timers 125a and 125b, memories 126a and 126b, second ON delay timers 127a and 127b, and NOT gates 128a and 128b are added to the circuits of FIG. 12 and FIG. 16.

In the last control cycle, the timer 125b operates with the generation of the brake relieving signal AVHR of the rear wheel 11a on the low side. The generating time of the signal AVHR is measured by the timer 125b. When the signal AVHR disappears, the output of the NOT gate 128b becomes "1", and it is supplied to the memory 126b. Thus, the measurement result is transferred to the memory 126b, and is memorized there. The output of the ON delay timer 127b becomes "1" in the delay time of the ON delay timer 127b after the output of the NOT gate 128b becomes "1". The measurement time set in the timer 125b is erased with the output of the ON delay timer 127a. The timer signal memorized in the memory 126b is supplied to the ON delay timer 115b. The delay time proportional to the time signal is set in the ON delay timer 115b.

In the first modification (FIG. 15) of this embodiment, the low side is changed over in the case that the rear wheel 11b on the high side generates continuously the brake relieving signal for a longer time than the predetermined time during the time that the rear wheel 11a on the low side is rotating in the stable region of the μ-slip characteristics. The above predetermined time is made the delay time set in the ON delay timers 133a, 133b. However, the delay time may be changed in accordance with the brake relieving time of the rear wheel 11a on the low side in the last control cycle.

Figure 18:
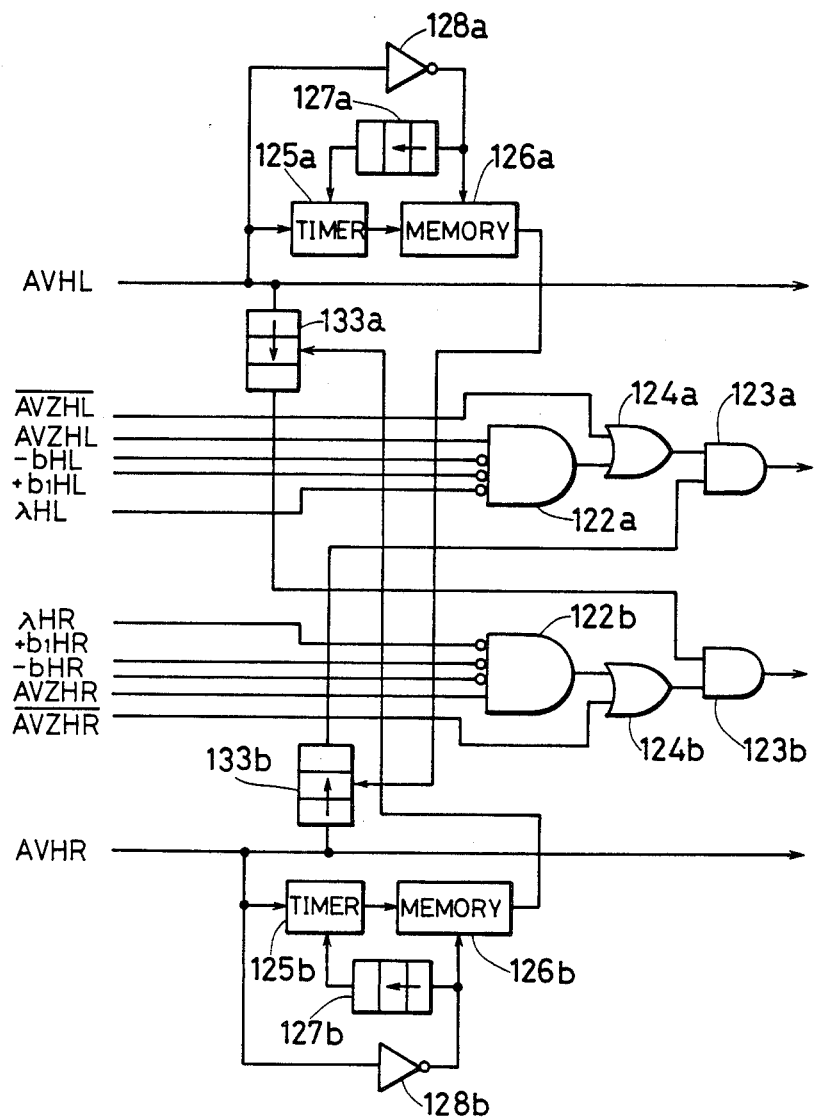
FIG. 18 is a circuit diagram of an important part of a fourth modification of the logic circuit of FIG. 12.

FIG. 18 shows such a fourth modification of this embodiment as to obtain the above operation. Other parts are the same as the circuit of FIG. 12. Parts in FIG. 18 which correspond to those in FIG. 15 and 17, are denoted by the same reference numerals.

In FIG. 18, it is clear that the delay time of the ON delay timers 133a, 133b can be changed in accordance with the brake relieving time of the rear wheel 11a on the low side in the last control cycle, in the same manner as the described operations of the circuit of FIG. 17.

According to a fifth modification of this embodiment, when the rear wheel 11a on the low side is rotating continuously for a longer time than a predetermined time in the stable region of the μ-slip characteristics, the side which generates sooner the brake maintaining signal or brake relieving signal than the other side, with respect to the rear wheels, is newly made "low side". That can be effected with the circuit of FIG. 19.

Figure 19:
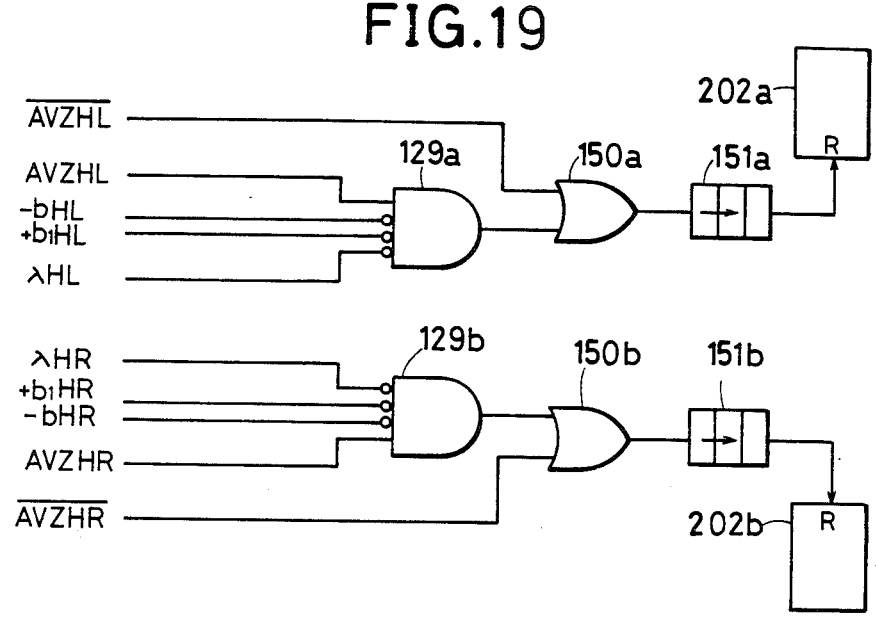
FIG. 19 is a circuit diagram of an important part of a fifth modification of the logic circuit of FIG. 12.

In FIG. 19, the signals AVZHL and AVZHR are supplied to first input terminals of AND gates 129a and 129b. Further, the signals λHL, λHR, +b₁HL, +b₁HR and −bHL, −bHR are supplied to second, third and fourth negation input terminals of the AND gates 129a and 129b. Output terminals of the AND gates 129a and 129b are connected to one input terminals of OR gates 150a and 150b. The signals AVZHL and AVZHR are supplied to the other input terminals of the OR gates 150a and 150b. Output terminals of the OR gates 150a and 150b are connected through ON delay timers 151a and 151b to the reset terminals of the flip-flops 202a and 202b of FIG. 5.

When the rear wheel on the low side is rotating continuously in the stable region of the μ-slip characteristics for a longer time than the delay time of the ON delay timers 131a and 131b, the flip-flops 202a and 202b is reset, and put into the initial condition. Thus, the side of the rear wheel which sooner generates the brake maintaining signal or brake relieving signal, is newly made "low side". Hereafter, the above described operations are effected.

According to sixth modification, when the rear wheel on the low side generates continuously the brake increasing signal for a longer time than a predetermined time, the side of the rear wheel which generates sooner the brake maintaining signal or brake relieving signal than other, is newly made "low side". That can be effected with the circuit of FIG. 20.

Figure 20:
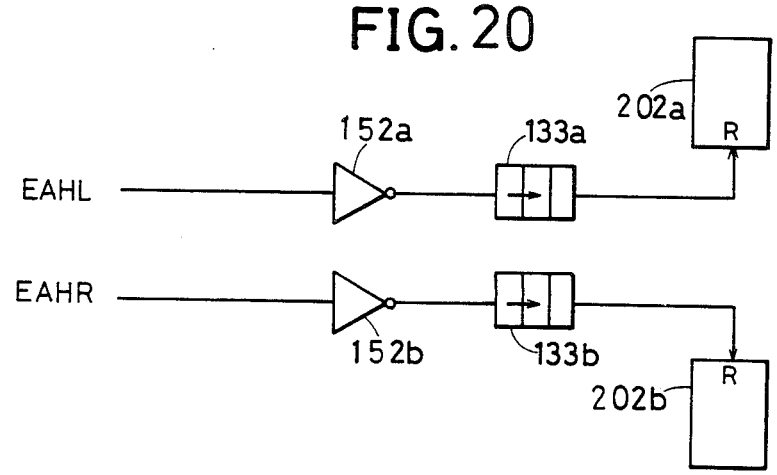
FIG. 20 is a circuit diagram of an important part of a sixth modification of the logic circuit of FIG. 12.

In FIG. 20, the signals EAHL and EAHR are supplied to NOT gates 152a and 152b. Output terminals of the NOT gates 152a and 152b are connected through ON delay timers 133a and 133b to the reset terminals R of the flip-flops 102a and 102b.

When the rear wheel on the low side generates continuously the brake increasing signal for a longer time than the delay time of the ON delay timers 133a or 133b, the flip-flop 202a or 202b is reset and put into the initial condition. And it is newly judged which side of the road is "low side". Other part are the same as the circuit of FIG. 12.

According to seventh modification of this invention, the "low side" is changed over in the case that the rear wheel on the high side generates the brake relieving signal during the time that both of the front and rear wheels on the low side are rotating in the stable region of the μ-slip characteristics. That can be effected with the circuit of FIG. 21. Other parts are the same as the circuit of FIG. 12.

Figure 21:
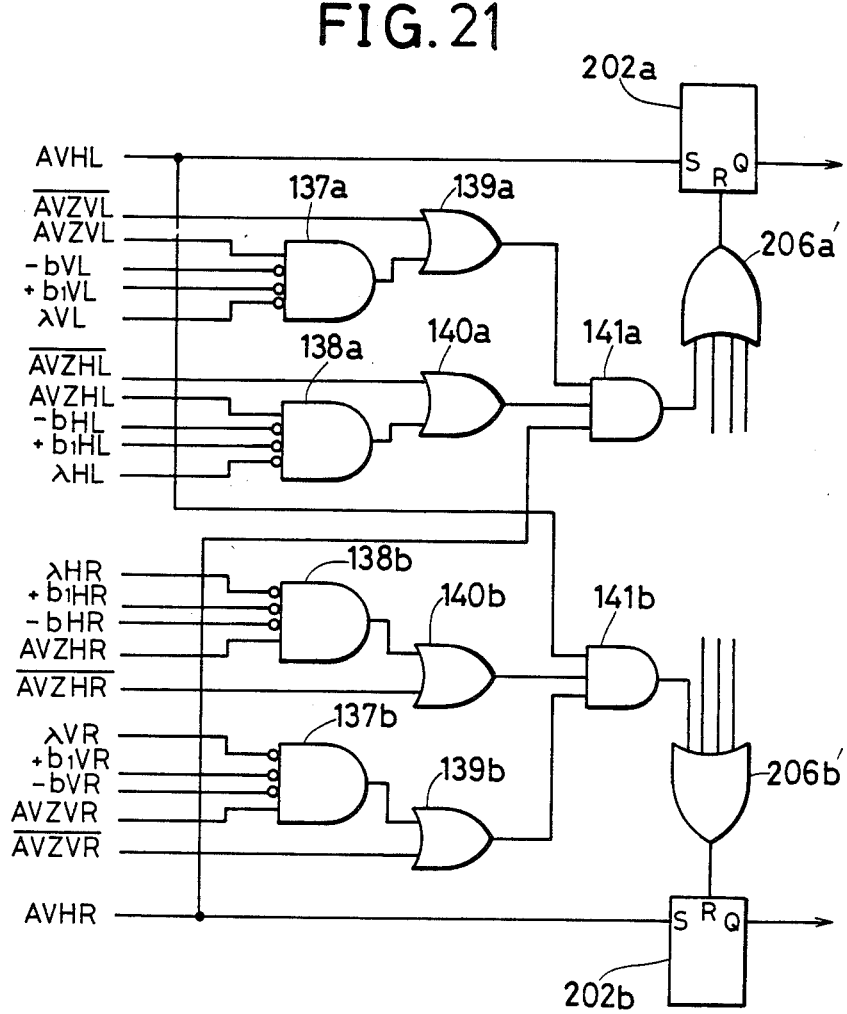
FIG. 21 is a circuit diagram of an important part of a seventh modification of the logic circuit of FIG. 12.

In FIG. 21, the signals λVL, λVR, +b₁VL, +b₁VR, and −bVL, −bVR, of the front wheels, are supplied to second, third and fourth negation input terminals of AND gates 137a and 137b, respectively. And the signals AVZVL and AVZVR of the front wheels are supplied to first input terminals of the AND gates 137a and 137b. Output terminals of the AND gates 137a and 137b are connected to one input terminals of OR gates 139a and 139b. The signals −bHL, −bHR, +b₁HL, +b₁HR, and λHL, λHR, of the rear wheels, are supplied to second, third and fourth negation input terminals of AND gates 138a and 138b, respectively. And the signals AVZHL and AVZHR of the rear wheels are supplied to first input terminals of the AND gates 138a and 138b. Output terminals of the AND gates 138a and 138b are connected to one input terminals of OR gates 140a and 140b.

The signals $\overline{ANZVL}$, $\overline{AVZVR}$, $\overline{AVZHL}$ and $\overline{AVZHR}$ are supplied to the other terminals of the OR gates 139a, 139b, 140a and 140b. Output terminals thereof are connected to first input terminals of AND gates 141a and 141b. Output terminals of the OR gates 140a and 140b are connected to second input terminals of the AND gates 141a and 141b. The signals AVHR and AVHL are supplied to third input terminals thereof. Output terminals of the AND gates 141a and 141b are connected to input terminals of the OR gates 206a' and 206b'.

Now it is assumed that the right side of the road is "low side", and that both of the front and rear wheels on the low side are rotating in the stable region of the μ-slip characteristics.

At that time, the outputs of the AND gates 138b, 137b become "1". The rear wheel on the high side generates the brake relieving signal AVHL, so that the output of the AND gate 141b becomes "1", and the flip-flop 202b is put into the reset condition. Accordingly, the other flip-flop 202a are released from the reset condition, and put into the set condition with the signal AVHL. Thus, the "low side" is changed over. This modification is effective for the case that the vehicle runs on the meandering or slalom road.

According to eighth modification of this embodiment, the braking force of the low side is rapidly increased during the time any one of the rear wheels 11a and 11b are rapidly accelerated beyond the second acceleration threshold. That can be effected with the circuit of FIG. 22. Other parts are the same as the circuit of FIG. 12.

An OR gate 143 and an AND gate 144 are added to the circuit of FIG. 12. The signals $+b_2HL$ and $+b_2HR$ are supplied to input terminals of the OR gate 143. An output thereof is connected to a negation input terminal of the AND gates 144. The signal EVH is supplied to another input terminal of the AND gate 144. An output terminal thereof is connected to the input terminals of the AND gates 204a and 204b.

Figure 22:
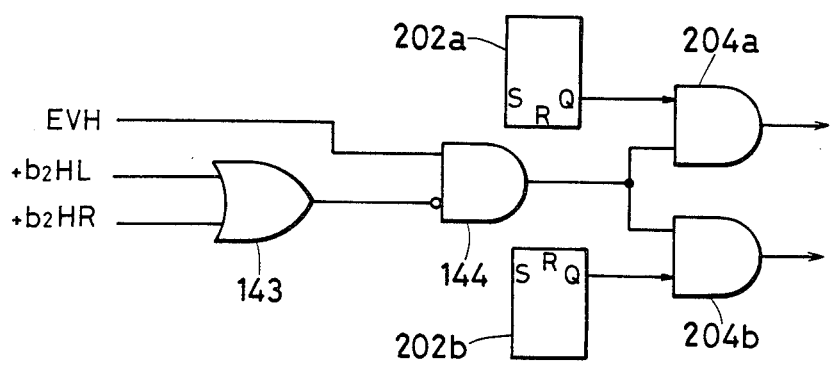
FIG. 22 is a circuit diagram of an important part of an eight modification of the logic circuit of FIG. 12.

In FIG. 22, it is assumed that the right side of the road is "low side". When the signal EVH is generated, the output of the AND gate 204b becomes "1", and the output signal EV becomes "1". The braking forces to the right front and rear wheels 6a and 11b are maintained at constant. When any one of the rear wheels 11a and 11b are rapidly accelerated beyond the second acceleration threshold at a certain time, the output of the OR gate 143 becomes "1". Accordingly the output of the AND gate 144 becomes "0", and the braking forces to the low side wheels are rapidly increased. Thus, the braking distance can be shortened much.

While the preferred embodiment has been described, variations thereto will occur to those skilled in the art within the scope of the present inventive concepts which are delineated by the following claims.

For example, according to the circuit (FIG. 15) of the first modification the "low side" is changed over in the case that the rear wheel 11b on the "high side" generates continuously the pressure decreasing signal AVHL for a longer time than a predetermined time, while the rear wheel 11a on the "low side" is rotating in the stable region or condition of the "μ-slip characteristics". Instead, the "low-side" may be changed over in the case that the slip of the rear and/or front wheel on the "high side" becomes higher than a second predetermined slip which is lower than the predetermined slip for generating the brake relieving signal, while the rear and/or front wheel on the "low side" is rotating in the stable region or condition of the "μ-slip characteristics". Such a modification is effective for the vehicle's slalom running on a uniform high-μ road which is meandering. The wheel speed of the wheel on the inside of the curve is lower, and accordingly, the inside of the curve corresponds to the "low side". When the slip of the wheel on the low side becomes higher than the second predetermined slip (smaller), it is preferable that the low side is changed over, before the brake relieving signal is generated from the wheel on the outside of the curve which runs, in turn, on the inside of the curve. Because the braking pressure of the front wheel running sequently on the outside of the curve can be increased, and the over-steering can be prevented. The second predetermined slip rate is lower than the slip ratios λ1,λ2 in FIG. 10. The anti-skid control operation has started. Accordingly, the motor drive signal Qo is generating. The wheels on the low side is in the stage region of the "μ-slip characteristics". The logic can be formed under the above conditions.

Figure 23:
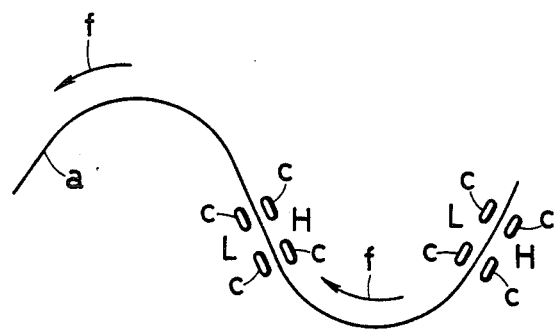
FIG. 23 and FIG. 24 are charts for explaining a further modification.
Figure 24:
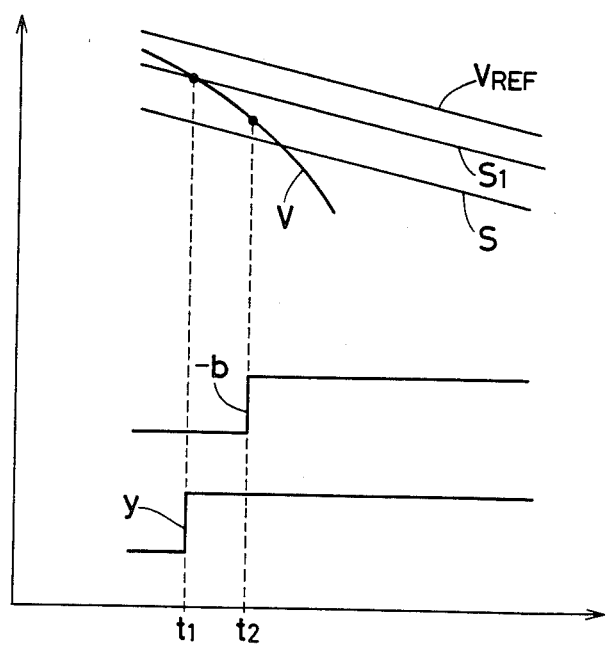

The above is illustrated in FIG. 23 and FIG. 24. As shown in FIG. 23, the vehicle or automobile is running on the meandering road in the direction shown by the arrow f. The frictional coefficient is uniformly high in the meandering road (H-μ road). The reference letters c represent the wheels. The inside of the curve is "low side" from the pressing relationship between the wheel and the road due to the centrifugal force. The outside of the curve is "high side". The reference letters L and H represent "low side" and "high side" respectively.

FIG. 24 shows the relationships between the approximate vehicle speed and the slips S1 and S, and between those and control signals-b, Y. Under the anti-skid control, the slip S1 corresponds to Vλ1 of the above described embodiments. The predetermined S1 of the modification is smaller than the slip S. The reference letter V represents the wheel speed. When the slip of the wheel becomes lower than the slip S1 at time t1, the change-over signal y generates and the low side is changed over with the change-over signal y. As clear from the judge circuit (FIG. 10) of the above embodiment, the brake relieving signal is generated not only by the slip signal but also by the deceleration signal −b during the anti-skid control operation. Accordingly, when the signal −b is generated at t2, the brake relieving signal is generated and the low side may be changed over with the signal −b. Thus, the braking pressure of the front wheel c which runs sequently on the out-side of the curve, can be increased and so the over-steering can be prevented. Accordingly, this modification is effective for the so called "slalom drive" of the vehicle.

Further in order to securely obtain the above effect, the low side may be changed over in the case that the lateral acceleration is inverted and it becomes higher than a predetermined value, and that the slip of he front and/or rear wheel on the high side becomes higher than the second predetermined slip S1, while the front and/or rear wheel on the low side is rotating in the stable region of the μ-slip characteristics. Further when the front and/or rear wheel on the low side has recovered to the stable region of the μ-slip characteristic, the low side may be reset. Or the side that the slip becomes higher than the predetermined slip sooner, thereafter, or the brake relieving signal is generated sooner thereafter, may be made low side.

Further in the above embodiment, this invention is applied to the 4WD vehicle. This invention may be applied both to the 4WD vehicle of the part time type and to the 4WD vehicle of the full time type. Further it may be applied also to the vehicle of the usual type such as, FF (front engine, front drive) type, FR (front engine rear drive) type and RR (rear engine rear drive) type. And further it may be applied to any other type of the vehicle. Further in the above embodiments, the LSD (Limited Slip Differential) or viscous coupling are used as the lock apparatus or torque distribution mechanism. In the viscous coupling, two plates are rotated in silicon oil, and shearing force occurs between them. Instead, a lock apparatus of the well-known other type or different torque distribution mechanism may be used.

What is claimed is:

1. In an anti-skid control apparatus for a vehicle braking system including:
   (A) a pair of front wheels, and a pair of rear wheels;
   (B) wheel speed sensors associated with said wheels, respectively;
   (C) a first fluid pressure control valve device for controlling the brake fluid pressure of the wheel cylinder of one of said front wheels, arranged between a first fluid pressure generating chamber of a tandem master cylinder and said wheel cylinder of the one front wheel;
   (D) a second fluid pressure control valve device for controlling the brake fluid pressure of the wheel cylinder of another of said front wheels, arranged between a second fluid pressure generating chamber of said tandem master cylinder and said wheel cylinder of the other front wheel; and
   (E) a control unit receiving outputs of said wheel speed sensors for measuring or judging the skid conditions of said front and rear wheels and for generating instructions for controlling said first and second fluid pressure control valve devices; the improvements in which said control unit discriminates the low side comprising the frictionally lower one of the sides of the road on which said wheels are running, on the basis of the measuring or judging results of the skid conditions of said rear and/or front wheels, combines logically the measuring or judging results of the skid condition of the one rear wheel running on said low side of the road, with that of the one front wheel running on the same side as said low side, for generating the instruction for controlling said first or second fluid pressure control valve device for the corresponding front wheel, and generates the instruction for controlling said second or first fluid pressure control valve device for the other front wheel, on the basis of the measuring or judging result of the skid condition of the other front wheel running on the high side comprising the frictionally higher side of the road independently of those of said rear wheels.

2. An anti-skid control apparatus according to claim 1, in which said control unit detects the lower one of the wheel speeds of said rear or front wheels for discriminating said frictionally lower one of the sides of the road.

3. In an anti-skid control apparatus for a vehicle braking system including:
   (A) a pair of front wheels, and a pair of rear wheels;
   (B) wheel speed sensors associated with said wheels, respectively;
   (C) a first fluid pressure control valve device for controlling the brake fluid pressure of the wheel cylinder of one of said front wheels, arranged between a first fluid pressure generating chamber of a tandem master cylinder and said wheel cylinder of the one front wheel;
   (D) a second fluid pressure control valve device for controlling the brake fluid pressure of the wheel cylinder of another of said front wheels, arranged between a second fluid pressure generating chamber of said tandem master cylinder and said wheel cylinder of the other front wheel; and
   (E) a control unit receiving outputs of said wheel speed sensors for measuring or judging the skid conditions of said front and rear wheels and for generating instructions for controlling said first and second fluid pressure control valve devices; the improvements in which said control unit discriminates the low side comprising the frictionally lower one of the sides of the road on which said wheels are running, on the basis of the measuring of judging results of the skid conditions of said rear and/or front wheels, combines logically the measuring or judging results of the skid conditions of said rear wheels with the measuring or judging result of the skid condition of the one front wheel running on the low side for generating the instruction for controlling said first or second fluid pressure control valve device for the corresponding front wheel, and generates the instruction for controlling said second or first fluid pressure control valve device for the other front wheel, on the basis of the measuring or judging result of the skid condition of the other front wheel running on the high side comprising the frictionally higher side of the road independently of those of said rear wheels.

4. An anti-skid control apparatus according to claim 3, in which said measuring or judging results of the skid conditions include a brake increasing signal, a brake maintaining or holding signal and a brake relieving signal, and the side of the one rear wheel which generates said brake maintaining signal sooner than the other rear wheel, is made "low side"Z, before anyone of said rear wheels generates said brake relieving signal.

5. An anti-skid control apparatus according to claim 3, in which said measuring or judging results of the skid conditions include a brake increasing signal, a brake maintaining or holding signal and a brake relieving signal, and the side of the one rear wheel which generates said brake relieving signal sooner than the other rear wheel, is made "low side".

6. An anti-skid control apparatus according to claim 3, in which said "low side" is changed over in the case that said one rear wheel on the low side is rapidly accelerated beyond a predetermined acceleration threshold during the time when said other rear wheel on the high side generates said brake relieving signal.

7. An anti-skid control apparatus according to claim 6, in which said "low side" is changed over in the case that said other rear wheel on the high side generates continuously said brake relieving signal for a longer time than a predetermined time during the time when said one rear wheel on the low side is rotating in the stable region of the μ (frictional coefficient) - slip characteristics.

8. An anti-skid control apparatus according to claim 6, in which said "low side" is changed over in the case that said other rear wheel on the high side generates continuously said brake relieving signal for a longer time than a predetermined time during the time when said brake relieving signal of the one rear wheel on the low side disappears.

9. An anti-skid control apparatus according to claim 5, in which said predetermined time is changed in accordance with the continuation time of said brake relieving signal of the one rear wheel on the low side in the last control cycle, or of the brake relieving signal obtained from the result of the select-low calculation of both said rear wheels.

10. An anti-skid control apparatus according to claim 4, in which, when said one rear wheel on the low side has rotated continuously in the stable region of the μ-slip characteristics for a longer time than a predetermined time, the side of the one rear wheel which generates said brake maintaining signal sooner than the other rear wheel, is newly made "low side", before anyone of said rear wheels generates said brake relieving signal.

11. An anti-skid control apparatus according to claim 5, in which, when said one rear wheel on the low side has rotated continuously in the stable region of the μ-slip characteristics for a longer time than a predetermined time, the side of the one rear wheel which generates said brake relieving signal sooner than the other rear wheel, is newly made "low side".

12. An anti-skid control apparatus according to claim 4, in which said measuring or judging results of the skid conditions further includes a brake step-wisely increasing signal, and when the number of the steps of said brake step-wisely increasing signal for said one rear wheel on the low side has reached a predetermined value, the side of the one rear wheel which generates said brake maintaining signal sooner than the other rear wheel, is newly made "low side", before anyone of said rear wheels generates said brake relieving signal.

13. An anti-skid control apparatus according to claim 5, in which said measuring or judging results of the skid conditions further includes a brake step-wisely increasing signal, and when the number of the steps of said brake step-wisely increasing signal for said one rear wheel on the low side has reached a predetermined value, the side of the one rear wheel which generates said brake relieving signal sooner than the other rear wheel, is newly made "low side".

14. An anti-skid control apparatus according to claim 4, in which, when said one rear wheel on the low side generates continuously said brake increasing signal for a longer time than a predetermined time, the side of the one rear wheel which generates said brake maintaining signal sooner that the other rear wheel, is newly made "low side", before anyone of said rear wheels generates said brake relieving signal.

15. An anti-skid control apparatus according to claim 5, in which, when said one rear wheel on the low side generates continuously said brake increasing signal for a longer time than a predetermined time, the side of the one rear wheel which generates said brake relieving signal sooner than the other rear wheel, is newly made "low side".

16. An anti-skid control apparatus according to claim 5, in which said "low side" is changed over in the case that said other rear wheel on the high side generates said brake relieving signal during the time when both of said front and rear wheels on the low side is rotating in the stable region of the μ-slip characteristics.

17. An anti-skid control apparatus according to claim 3, in which, while any one of said rear wheels is rapidly accelerated beyond a predetermined acceleration threshold, the braking force to said low side is rapidly increased.

18. An anti-skid control apparatus according to claim 5, in which said "low side" is changed over in the case that the slip of said rear and/or front wheel on the high side has becomes higher than a second predetermined slip which is smaller than a first predetermined slip for generating said brake relieving signal, during the time when said front and/or rear wheel on the low side is rotating in the stable region of the μ-slip characteristics.

19. An anti-skid control apparatus according to claim 17 or 18, in which said "low side" is changed over in the case that the lateral acceleration is inverted, and becomes higher than a predetermined value, and the slip of said rear and/or front wheel on the high side becomes higher than said second predetermined slip, during the time when said front and/or rear wheel on the low side is rotating in the stable region of the μ-slip characteristics.

20. An anti-skid control apparatus according to claim 19, in which said "low side" is changed over in the case that said front and/or rear wheel on said low side has recovered again into the stable region of the μ-slip characteristics.

21. An anti-skid control apparatus according to claim 20, in which the side is made "low side" on which the slip sooner becomes higher than said predetermined slip thereafter, or said brake relieving signal generates sooner thereafter.

22. An anti-skid control apparatus according to claim 3, in which said control unit forms a first select-low control signal on the basis of the measuring or judging results of the skid conditions of both said rear wheels and a second select-low control signal on the basis of said first select-low control signal and measuring or judging result of the one front wheel on said low side, and, on the basis of said second select-low control signal, generates the instruction for controlling said first or second fluid pressure control valve device, and generates the instruction for controlling said second or first fluid pressure control valve device, on the basis of the measuring or judging result of the skid condition of the other front wheel running on the high side (frictionally higher side) independently of those of said rear wheels.

* * * * *